US012618698B2

(12) United States Patent
Bromley

(10) Patent No.: US 12,618,698 B2
(45) Date of Patent: May 5, 2026

(54) CYLINDER LOCK APPARATUS AND PARTS THEREOF

(71) Applicant: AVANTIS HARDWARE LTD, Cannock (GB)

(72) Inventor: Ryan Bromley, Cannock (GB)

(73) Assignee: AVANTIS HARDWARE LTD, Cannock (GB)

( * ) Notice: Subject to any disclaimer, the term of this patent is extended or adjusted under 35 U.S.C. 154(b) by 0 days.

(21) Appl. No.: 18/573,992

(22) PCT Filed: Jun. 24, 2022

(86) PCT No.: PCT/GB2022/051628
§ 371 (c)(1),
(2) Date: Dec. 22, 2023

(87) PCT Pub. No.: WO2022/269285
PCT Pub. Date: Dec. 29, 2022

(65) Prior Publication Data
US 2024/0200992 A1 Jun. 20, 2024

(30) Foreign Application Priority Data

Jun. 25, 2021 (GB) ...................................... 2109178
Mar. 25, 2022 (GB) ...................................... 2204224
May 5, 2022 (GB) ...................................... 2206602

(51) Int. Cl.
*G01D 21/02* (2006.01)
*G01D 5/14* (2006.01)
(52) U.S. Cl.
CPC ............. *G01D 21/02* (2013.01); *G01D 5/145* (2013.01); *G01D 2205/20* (2021.05)
(58) Field of Classification Search
CPC ... E05B 9/00; E05B 9/04; E05B 9/084; E05B 27/00; E05B 29/00; E05B 47/00;
(Continued)

(56) References Cited

U.S. PATENT DOCUMENTS 4,908,605 A * 3/1990 Takatsuka ............... E05B 19/22
70/432
6,255,957 B1 * 7/2001 Sonderegger ........... E05B 19/22
70/432
(Continued)

FOREIGN PATENT DOCUMENTS

DE 202005012218 U1 12/2005
EP 0006765 B1 1/1983
(Continued)

OTHER PUBLICATIONS

International Search Report and Written Opinion dated Oct. 14, 2022 for International Application No. PCT/GB2022/051628.
(Continued)

*Primary Examiner* — Nathan Cumar
(74) *Attorney, Agent, or Firm* — Pillsbury Winthrop Shaw Pittman LLP

(57) ABSTRACT

A lock apparatus including a cylinder lock and an actuation member configured to operate the cylinder lock via rotation of the actuation member with respect to a part of the cylinder lock, wherein: the cylinder lock includes a magnet, and the actuation member includes a smart actuation member circuit, the smart actuation member circuit including: one or more sensors (including one or more magnetic field sensors) configured to sense an action of the smart actuation member circuit with respect to the cylinder lock; and a processor or controller configured to receive information indicative of the sensed action from the or each sensor for use in determining a status of the cylinder lock. Furthermore, smart actuation member circuit, cylinder lock and method of fitting such a cylinder lock are claimed.

23 Claims, 16 Drawing Sheets

(58) Field of Classification Search
CPC ............... E05B 47/006; E05B 47/0038; E05B
47/0043; E05B 47/0044; E05B 47/0045;
E05B 73/0052; E05B 2047/0007; E05B
2047/0085; E05B 2047/005; E05B
2047/0054; G01D 21/02; G01D 5/145;
G01D 2205/20
USPC .......................................................... 70/344
See application file for complete search history.

(56) References Cited

U.S. PATENT DOCUMENTS

| | | | | |
|---|---|---|---|---|
| 9,528,296 | B1 * | 12/2016 | Cheng .................. | G08B 29/185 |
| 2006/0156771 | A1 * | 7/2006 | Hauri .................. | E05B 47/0649 70/278.7 |
| 2009/0293567 | A1 * | 12/2009 | Yuen ........................ | E05B 19/22 73/488 |
| 2011/0265530 | A1 * | 11/2011 | Nicoara .............. | E05B 47/0045 70/357 |
| 2014/0165679 | A1 * | 6/2014 | Dagnino ............. | E05B 27/0007 70/344 |
| 2014/0230500 | A1 * | 8/2014 | Oliana .................... | E05B 15/14 70/344 |
| 2014/0250959 | A1 * | 9/2014 | Tsai .................... | E05B 27/0046 70/344 |
| 2014/0283567 | A1 * | 9/2014 | Tobias ................ | E05B 27/0057 70/344 |
| 2015/0184423 | A1 * | 7/2015 | Chen ........................ | E05B 67/24 70/344 |
| 2015/0240523 | A1 * | 8/2015 | Chen ........................ | E05B 75/00 70/344 |
| 2015/0284975 | A1 * | 10/2015 | Karsil ................. | E05B 17/0062 70/344 |
| 2015/0300043 | A1 * | 10/2015 | van Buynder ........ | E05B 47/063 70/393 |
| 2015/0315816 | A1 * | 11/2015 | Gopalakrishnan ...... | E05B 63/06 70/344 |

FOREIGN PATENT DOCUMENTS

| | | | | | |
|---|---|---|---|---|---|
| GB | 2281938 | A | 3/1995 | | |
| JP | S5317497 | A | 2/1978 | | |
| JP | H01154979 | A | 6/1989 | | |
| JP | H07247743 | A | 9/1995 | | |
| JP | 2002327559 | A | 11/2002 | | |
| JP | 2011220057 | A | 11/2011 | | |
| JP | 2022089001 | A | 6/2022 | | |
| WO | 2012041471 | A1 | 4/2012 | | |
| WO | 2015063358 | A1 | 5/2015 | | |
| WO | 2019051337 | A1 | 3/2019 | | |
| WO | WO-2019130136 | A1 * | 7/2019 | .............. | E05B 9/22 |

OTHER PUBLICATIONS

Search Report under Section 17(5) dated Sep. 20, 2022 for related GB Application No. 2204224.6, pp. 1-7.
Office Action for European Application No. 22740955.4 dated Jan. 20, 2026, pp. 1-8.
Examination Report for Application No. GB2204224.6 dated Jan. 28, 2026, pp. 1-3.
E-mail communication regarding the Examination Report for Application No. GB2204224.6 dated Feb. 6, 2026, pp. 1-3.

* cited by examiner

Horizontal Key Assumed

| Int View | Door Side | Action | Rotation/Accelermoter | Key Position, Hall sensors facing Up or Down | 1 | 2 | 3 | 4 |
|---|---|---|---|---|---|---|---|---|
| Right Handed | Internal | Lock | CW | Up | HS1 - S | HS1 - N | HS2 - S | HS2 - N |
| | | Lock | CW | Down | HS2 - S | HS2 - N | HS1 - S | HS1 - N |
| | | Unlock | Anti-CW | Up | HS2 - N | HS2 - S | HS1 - N | HS1 - S |
| | | Unlock | Anti-CW | Down | HS1 - N | HS1 - S | HS2 - N | HS2 - S |
| | External | Lock | Anti-CW | Up | HS2 - S | HS2 - N | HS1 - S | HS1 - N |
| | | Lock | Anti-CW | Down | HS1 - S | HS1 - N | HS2 - S | HS2 - N |
| | | Unlock | CW | Up | HS1 - N | HS1 - S | HS2 - N | HS2 - S |
| | | Unlock | CW | Down | HS2 - N | HS2 - S | HS1 - N | HS1 - S |
| Left Handed | Internal | Lock | Anti-CW | Up | HS1 - S | HS1 - N | HS2 - S | HS2 - N |
| | | Lock | Anti-CW | Down | HS2 - S | HS2 - N | HS1 - S | HS1 - N |
| | | Unlock | CW | Up | HS2 - N | HS2 - S | HS1 - N | HS1 - S |
| | | Unlock | CW | Down | HS1 - N | HS1 - S | HS2 - N | HS2 - S |
| | External | Lock | CW | Up | HS2 - S | HS2 - N | HS1 - S | HS1 - N |
| | | Lock | CW | Down | HS1 - S | HS1 - N | HS2 - S | HS2 - N |
| | | Unlock | Anti-CW | Up | HS1 - N | HS1 - S | HS2 - N | HS2 - S |
| | | Unlock | Anti-CW | Down | HS2 - N | HS2 - S | HS1 - N | HS1 - S |

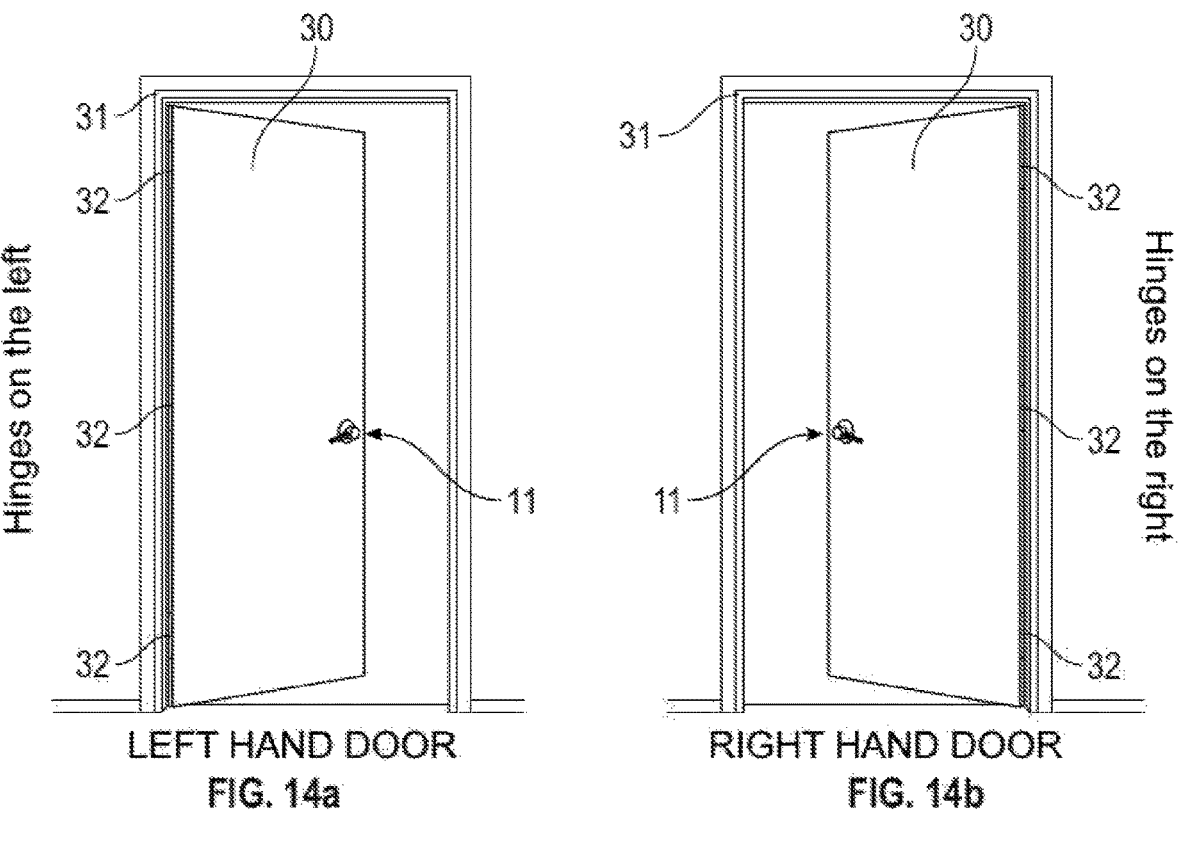
LEFT HAND DOOR
FIG. 14a
RIGHT HAND DOOR
FIG. 14b
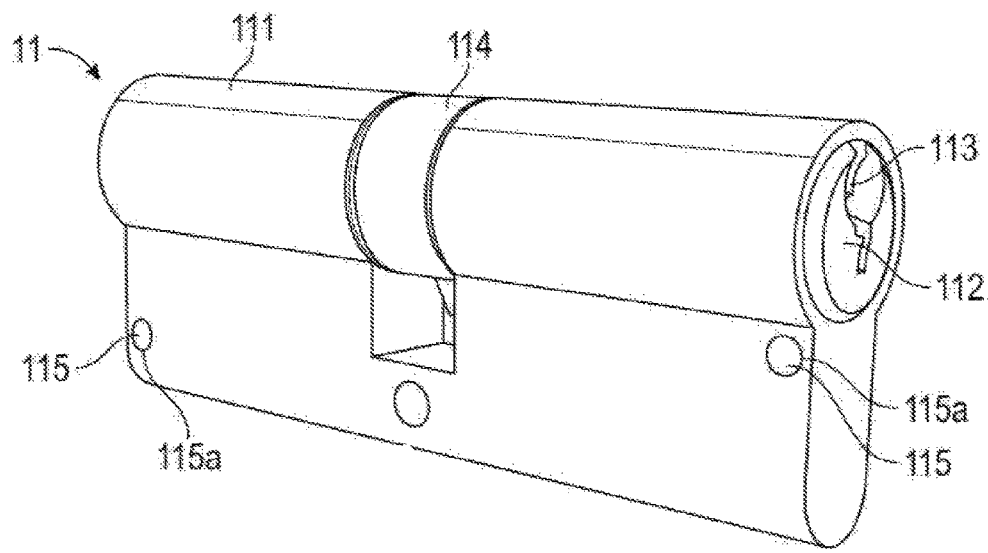
FIG. 15

SECTION A-A

SECTION B-B

CYLINDER LOCK APPARATUS AND PARTS THEREOF

FIELD

The present technology relates to a cylinder lock apparatus for providing an indication of the status of the cylinder lock (and parts thereof), a lock including the cylinder lock apparatus, and a method of fitting a cylinder lock apparatus.

BACKGROUND

There is a growing need for technology which can determine the status of a lock of a door or window. The determined status may then be transmitted to a remote location.

Conventionally, sensor technology for use with locks typically requires the replacement of the entire lock mechanism or even the door or window to be specifically manufactured for use with such technology. This provides an obstacle to the adoption of such technology.

There is a need to alleviate one or more problems associated with the prior art.

BRIEF DESCRIPTION OF THE INVENTION

An aspect provides a lock apparatus including a cylinder lock and an actuation member configured to operate the cylinder lock via rotation of the actuation member with respect to a part of the cylinder lock, wherein: the lock apparatus includes a magnet, and the actuation member includes a smart actuation member circuit, the smart actuation member circuit including: one or more sensors configured to sense an action of the smart actuation member circuit with respect to the cylinder lock, the one or more sensors including one or more magnetic field sensors; and a processor or controller configured to receive information indicative of the sensed action from the or each sensor for use in determining a status of the cylinder lock, wherein the or each magnetic field sensor and the magnet are configured such that rotation of the actuation member to operate the cylinder lock moves the or each magnetic field sensor through the magnetic field of the magnet and the magnet is configured such that this movement changes the sensed polarity of the magnetic field as the or each magnetic field sensor passes the magnet.

The magnet may be received in a magnet bore in the cylinder lock or the magnet may be housed in a magnet ring mated to the cylinder lock or a part of the cylinder lock.

The actuation member may be a key or thumbturn.

The one or more sensors may include an acceleration sensor.

The or each magnetic field sensor may be configured to sense the strength of the magnetic field.

The or each magnetic field sensor may include at least one Hall Effect sensor.

The one or more magnetic field sensors may include two magnetic field sensors.

The two magnetic field sensors may be spaced apart with respect to each other.

A lock apparatus may further include a third magnetic field sensor, wherein the third magnetic field sensor may be a primary magnetic field sensor and the other magnetic field sensors are secondary magnetic field sensors, and the secondary magnetic field sensors may be configured to be activated in response to the primary magnetic field sensor detecting a magnetic field.

The magnetic field sensors may each be a respective Hall Effect sensor.

The sensed action may be a movement of the smart actuation member circuit with respect to the part of the cylinder lock based on the received information.

The processor or controller may be configured to determine the sensed action based on the received information, the sensed action being one or more of: insertion of the actuation member into the cylinder lock; removal of the actuation member from the cylinder lock; rotation of the actuation member with respect to the cylinder lock in a first direction; rotation of the actuation member with respect to the cylinder lock in a second direction; a degree of rotation of the actuation member with respect to the cylinder lock in the first direction; and a degree of rotation of the actuation member with respect to the cylinder lock in the second direction.

The processor or controller may be configured to determine one or more of the rotation of the actuation member with respect to the cylinder lock in a first direction; the rotation of the actuation member with respect to the cylinder lock in a second direction; the degree of rotation of the actuation member with respect to the cylinder lock in the first direction; and the degree of rotation of the actuation member with respect to the cylinder lock in the second direction, by at least in part using information about the sensed polarity of the magnetic field.

The processor or controller may be configured to determine a status of the cylinder lock based on the determined action of the smart actuation member circuit.

The one or more sensors may include one or more of a location sensor and a proximity sensor.

The cylinder lock may include a sacrificial part configured to change the keying of the cylinder lock from a first keying to a second keying upon sacrifice of the sacrificial part.

The actuation member may be the key, and the key may include a receiving portion configured to receive the sacrificial part.

The processor or controller may be configured to transmit the received information to a hub or remote location.

A lock apparatus may further include the hub wherein the hub may include a computing device.

The or each magnet may have a magnetic axis which is substantially perpendicular to a rotational axis of the actuation member.

The or each magnetic axis may be offset from the rotational axis of the actuation member.

The rotation of the actuation member to operate the cylinder lock may include rotation of a plug of the cylinder lock with respect to a body of the cylinder lock, the plug being configured for rotation with the actuation member.

The actuation member may be removably received by the plug.

Another aspect provides a smart actuation member circuit for use in a lock cylinder apparatus as above.

Another aspect provides a smart key circuit for use with a key which is keyed for a cylinder lock, the smart key circuit including: two magnetic field sensors configured to sense an action of the smart key circuit with respect to the cylinder lock; and a processor or controller configured to receive information indicative of the sensed action from the or each sensor for use in determining a status of the cylinder lock, wherein a first magnetic field sensor is configured to be located on a first side of a shaft of the key and a second magnetic field sensor is configured to be located on a second side of the shaft.

Another aspect provides a cylinder lock including: a body; a plug configured for rotation with respect to the body, about an axis of rotation, to operate the cylinder lock; and a magnet, wherein a magnetic axis of the magnet is substantially perpendicular to the axis of rotation.

Another aspect provides a method of fitting a cylinder lock to a lock system, the method including: providing a cylinder lock as above; and fitting the cylinder lock to the lock system.

The method may further include the step of removing an existing cylinder lock from the lock system before fitting the cylinder lock to the lock system.

An aspect provides a lock apparatus including a cylinder lock and an actuation member configured to operate the cylinder lock via rotation of the actuation member with respect to a part of the cylinder lock, wherein: the cylinder lock includes a magnet, and the actuation member includes a smart actuation member circuit, the smart actuation member circuit including: one or more sensors configured to sense an action of the smart actuation member circuit with respect to the cylinder lock, the one or more sensors including one or more magnetic field sensors; and a processor or controller configured to receive information indicative of the sensed action from the or each sensor for use in determining a status of the cylinder lock, wherein the or each magnetic field sensor and the magnet are configured such that rotation of the actuation member to operate the cylinder lock moves the or each magnetic field sensor through the magnetic field of the magnet and the magnet is configured such that this movement changes the sensed polarity of the magnetic field as the or each magnetic field sensor passes the magnet.

The magnet may be received in a magnet bore in the cylinder lock.

The actuation member may be a key or thumbturn.

The one or more sensors may include an acceleration sensor.

The or each magnetic field sensor may be configured to sense the strength of the magnetic field.

The or each magnetic field sensor may include at least one Hall Effect sensor.

The one or more magnetic field sensors may include two magnetic field sensors.

The two magnetic field sensors may be spaced apart with respect to each other.

The lock apparatus may further include a third magnetic field sensor, wherein the third magnetic field sensor may be a primary magnetic field sensor and the other magnetic field sensors may be secondary magnetic field sensors, and the secondary magnetic field sensors may be configured to be activated in response to the primary magnetic field sensor detecting a magnetic field.

The magnetic field sensors may each be a respective Hall Effect sensor.

The sensed action may be a movement of the smart actuation member circuit with respect to the part of the cylinder lock based on the received information.

The processor or controller may be configured to determine the sensed action based on the received information, the sensed action being one or more of: insertion of the actuation member into the cylinder lock; removal of the actuation member from the cylinder lock; rotation of the actuation member with respect to the cylinder lock in a first direction; rotation of the actuation member with respect to the cylinder lock in a second direction; a degree of rotation of the actuation member with respect to the cylinder lock in the first direction; and a degree of rotation of the actuation member with respect to the cylinder lock in the second direction.

The processor or controller may be configured to determine one or more of the rotation of the actuation member with respect to the cylinder lock in a first direction; the rotation of the actuation member with respect to the cylinder lock in a second direction; the degree of rotation of the actuation member with respect to the cylinder lock in the first direction; and the degree of rotation of the actuation member with respect to the cylinder lock in the second direction, by at least in part using information about the sensed polarity of the magnetic field.

The processor or controller may be configured to determine a status of the cylinder lock based on the determined action of the smart actuation member circuit.

The one or more sensors may include one or more of a location sensor and a proximity sensor.

The cylinder lock may include a sacrificial part configured to change the keying of the cylinder lock from a first keying to a second keying upon sacrifice of the sacrificial part.

The actuation member may be the key, and the key may include a receiving portion configured to receive the sacrificial part.

The processor or controller may be configured to transmit the received information to a hub or remote location.

A lock apparatus may further include the hub wherein the hub includes a hub includes a computing device.

The or each magnet may have a magnetic axis which is substantially perpendicular to a rotational axis of the actuation member.

The or each magnetic axis may be offset from the rotational axis of the actuation member.

The rotation of the actuation member to operate the cylinder lock may include rotation of a plug of the cylinder lock with respect to a body of the cylinder lock, the plug being configured for rotation with the actuation member.

The actuation member may be removably received by the plug.

Another aspect provides a smart actuation member circuit for use in a lock cylinder apparatus as above.

Another aspect provides a smart key circuit for use with a key which is keyed for a cylinder lock, the smart key circuit including: two magnetic field sensors configured to sense an action of the smart key circuit with respect to the cylinder lock; and a processor or controller configured to receive information indicative of the sensed action from the or each sensor for use in determining a status of the cylinder lock, wherein a first magnetic field sensor is configured to be located on a first side of a shaft of the key and a second magnetic field sensor is configured to be located on a second side of the shaft.

Another aspect provides a cylinder lock including: a body; a plug configured for rotation with respect to the body, about an axis of rotation, to operate the cylinder lock; and a magnet, wherein a magnetic axis of the magnet is substantially perpendicular to the axis of rotation.

Another aspect provides a method of fitting a cylinder lock to a lock system, the method including: providing a cylinder lock; and fitting the cylinder lock to the lock system.

A method may further include the step of removing an existing cylinder lock from the lock system before fitting the cylinder lock to the lock system.

An aspect provides a smart key circuit for use with a key which is keyed for a cylinder lock, the smart key circuit including: one or more sensors configured to sense an action of the smart key circuit with respect to the cylinder lock; and a processor or controller configured to receive information indicative of the sensed action from the or each sensor for use in determining a status of the cylinder lock.

The one or more sensors may include at least one magnetic field sensor.

The one or more sensors may include at least one magnetic field sensor.

The one or more sensors may include two magnetic field sensors.

The two magnetic field sensors may be spaced apart with respect to each other.

The or each magnetic field sensor may be configured to sense one or more of: the presence of a magnetic field, the polarity of a magnetic field, and the strength of a magnetic field.

The or each magnetic field sensor may include at least one Hall Effect sensor.

The magnetic field sensors may each be respective Hall Effect sensors.

The processor or controller may be configured to determine a movement of the smart key circuit with respect to the cylinder lock based on the received information.

The smart key circuit may be fitted to the key.

The processor or controller may be configured to determining one or more of:

insertion of the key into the cylinder lock;

removal of the key from the cylinder lock;

rotation of the key with respect to the cylinder lock in a first direction;

rotation of the key with respect to the cylinder lock in a second direction;

a degree of rotation of the key with respect to the cylinder lock in the first direction; and a degree of rotation of the key with respect to the cylinder lock in the second direction.

The processor or controller may be configured to determine one or more of the rotation of the key with respect to the cylinder lock in a first direction; the rotation of the key with respect to the cylinder lock in a second direction; the degree of rotation of the key with respect to the cylinder lock in the first direction; and the degree of rotation of the key with respect to the cylinder lock in the second direction, by at least in part using information about one or more of a polarity of a sensed magnetic field and a field strength of a sensed magnetic field, wherein this information is provided by the or each sensor.

The processor or controller may be configured to determine a status of the cylinder lock based on the determined action of the smart key circuit.

The or each sensor may include one or more of an acceleration and proximity sensor.

The processor or controller may be configured to transmit the received information to a hub or remote location.

Another aspect provides a key including a smart key circuit as above.

Another aspect provides a cylinder lock configured for use with the smart key circuit or key as above.

A cylinder lock may further include a magnet bore configured to receive a magnet.

A cylinder lock may further include the magnet.

Another aspect provides a lock apparatus including a key as above and a cylinder lock of as above.

The or each sensor and the magnet may be configured such that rotation of the key moves the or each sensor through the magnetic field of the magnet.

The or each sensor may be configured to move through the magnetic field in a first direction with rotation of the key and the magnet may be configured such that this movement will change the sensed polarity of the magnetic field as the or each sensor passes the magnet.

Another aspect provides a method of fitting a cylinder lock to a lock system, the method including: providing a cylinder lock; and fitting the cylinder lock to the lock system.

A method may further include the step of removing an existing cylinder lock from the lock system before fitting the cylinder lock to the lock system.

BRIEF DESCRIPTION OF THE FIGURES

In order that the present disclosure may be more readily understood, preferable embodiments thereof will now be described, by way of example only, with reference to the accompanying drawings, in which:

FIG. 12 shows a logic table;

FIG. 13$a$ is a schematic view of a first side of a cylinder lock;

FIG. 13$b$ is a schematic view of a second side of the cylinder lock of FIG. 13$a$;

FIG. 13$c$ is a schematic side view of a smart actuation member circuit;

FIG. 13$d$ is a schematic plan view of the smart actuation member circuit of FIG. 13$c$;

FIG. 14$a$ is a schematic illustration of a left-handed door;

FIG. 14$b$ is a schematic illustration of a right-handed door;

FIG. 15 is a perspective view of a cylinder lock;

FIG. 17$b$ is a sectional view of the cylinder lock of FIG. 16 taken along the line B-B;

FIG. 22$b$ is a rear perspective view of the magnet ring of FIG. 22$a$.

DETAILED DESCRIPTION OF THE DISCLOSURE

Figure 5:
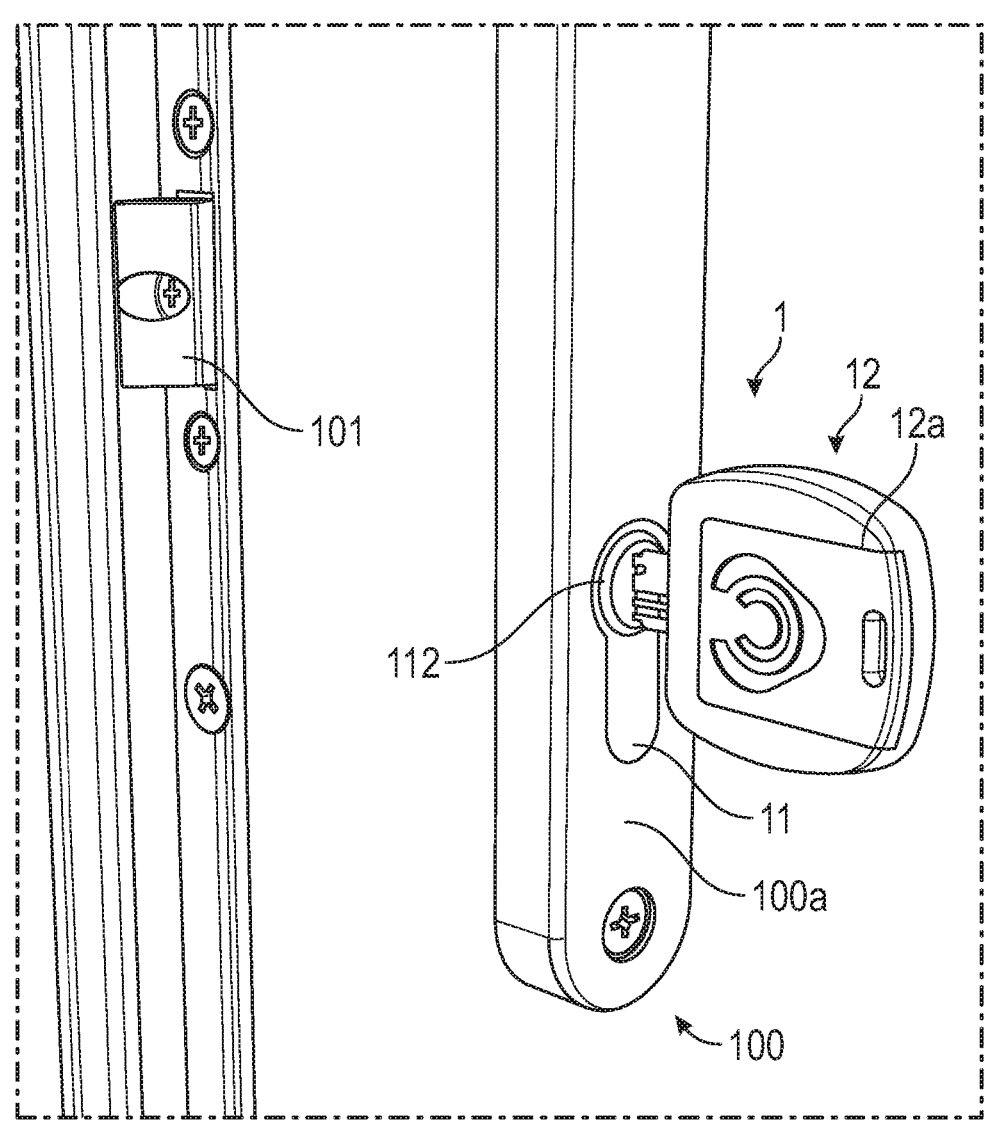
FIG. 5 is a view of a key received by a cylinder lock fitted to a lock system.
Figure 11:
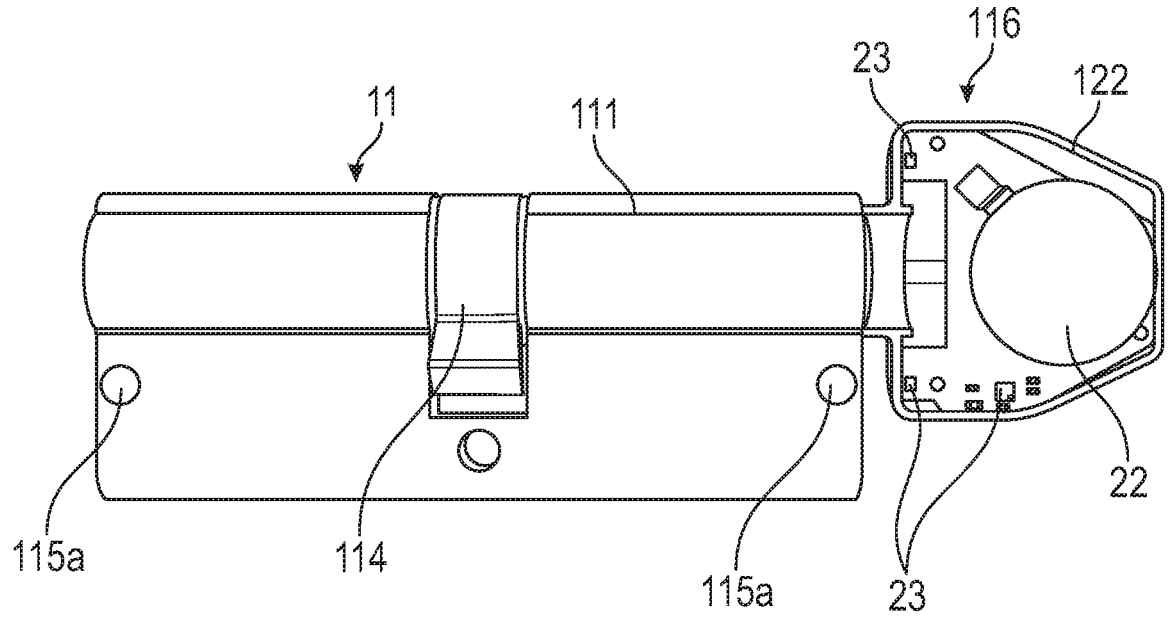
FIG. 11 is a view of a cylinder lock with a thumbturn.
Figure 16:
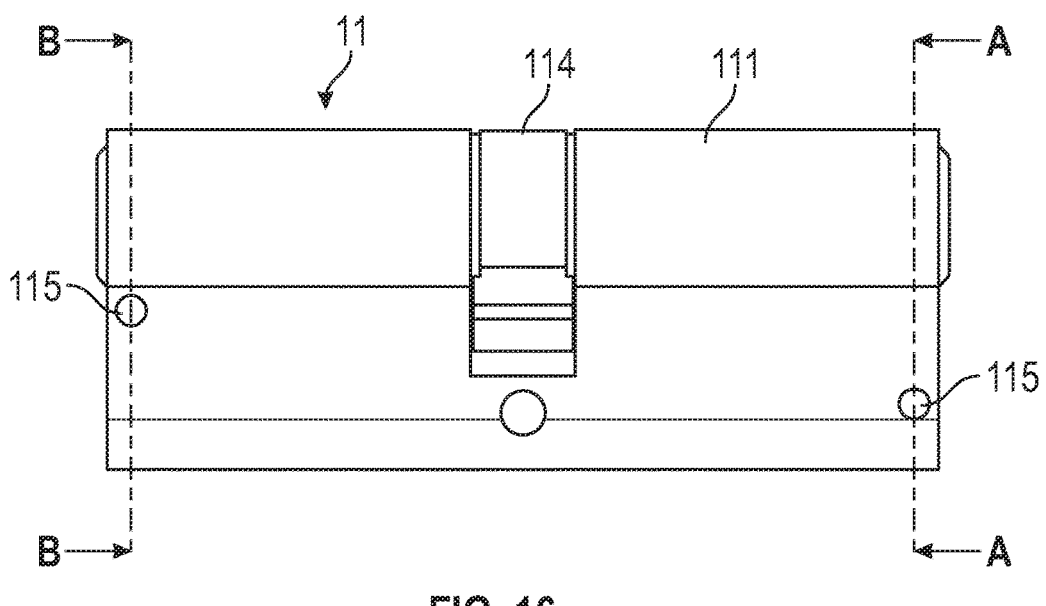
FIG. 16 is a side view of a cylinder lock.

Versions of the present technology include a lock apparatus 1 (see FIG. 5, for example) which may include a cylinder lock 11 (see FIGS. 1, 11, and 15, for example) and/or a key 12 (see FIGS. 2-9 and 18, for example) and/or a thumbturn 116 (see FIG. 11, for example). The key 12 may be configured (i.e. keyed) for use with the cylinder lock 11.

Figure 1:
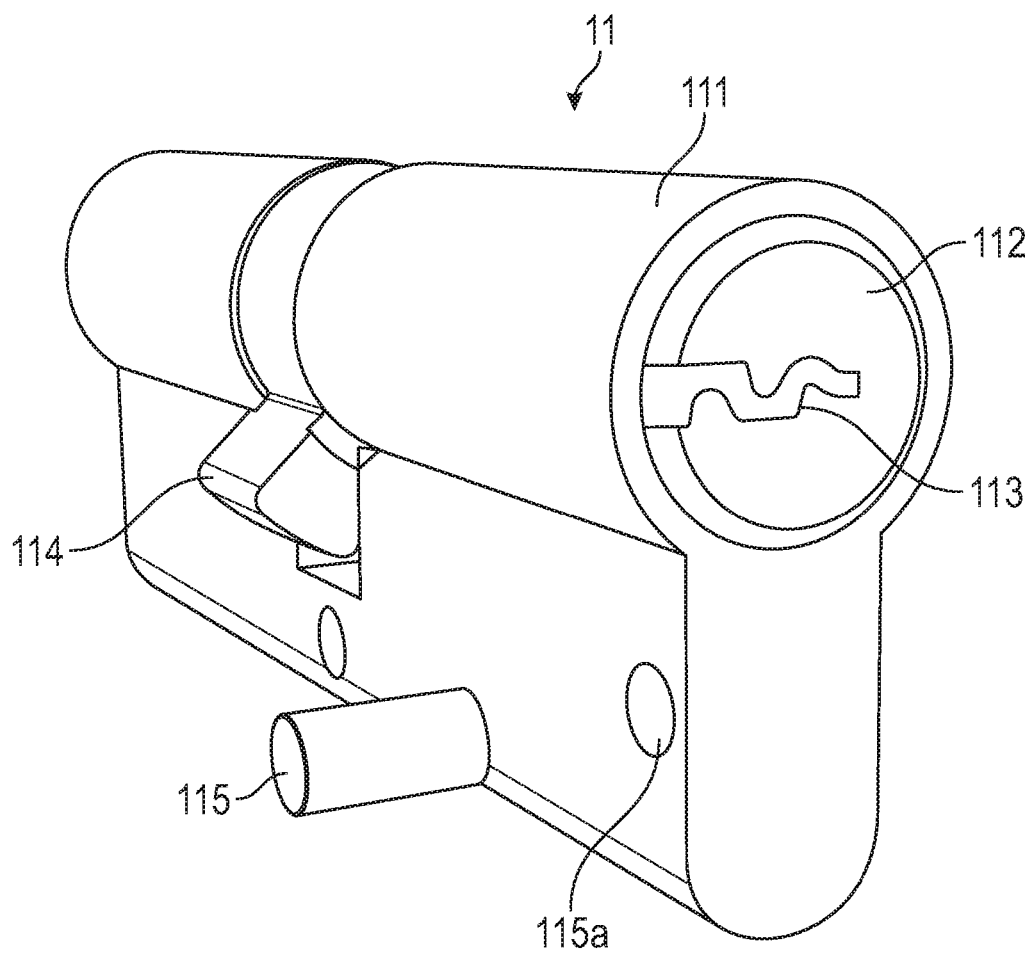
FIG. 1 is a view of a cylinder lock.
Figure 2:
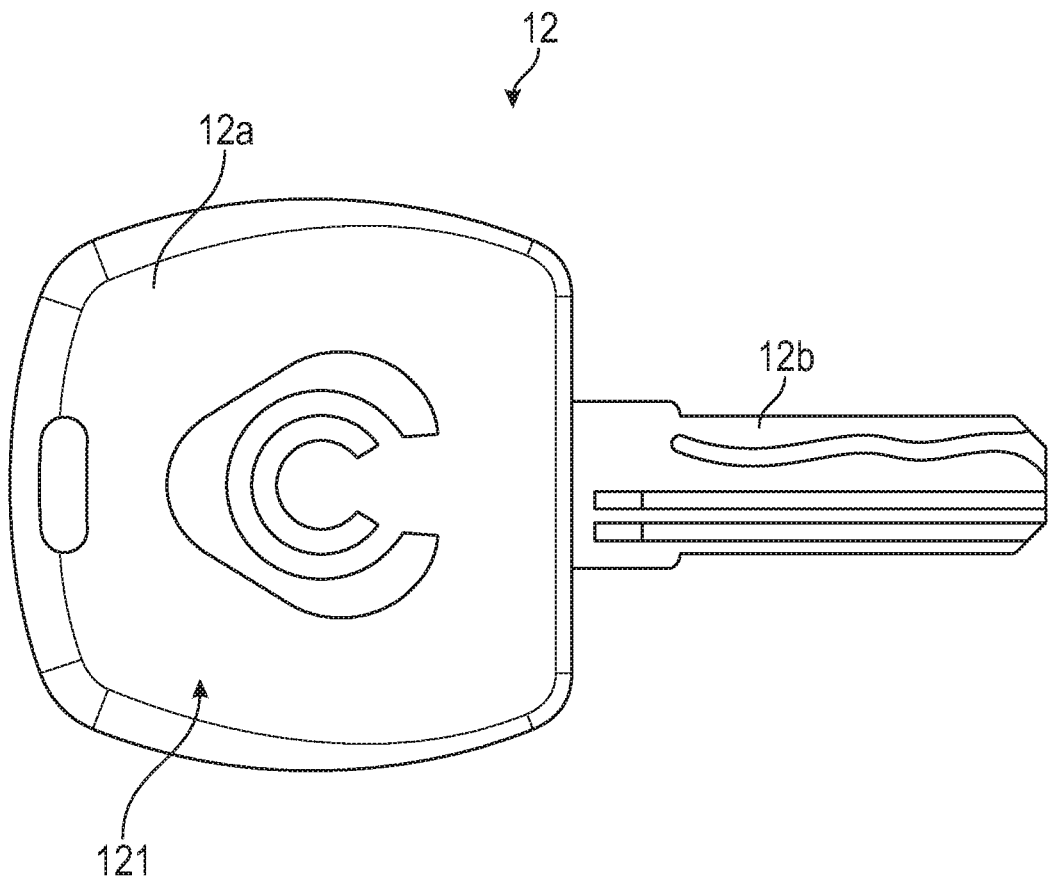
FIGS. 2-4 are views of a key.
Figure 3:
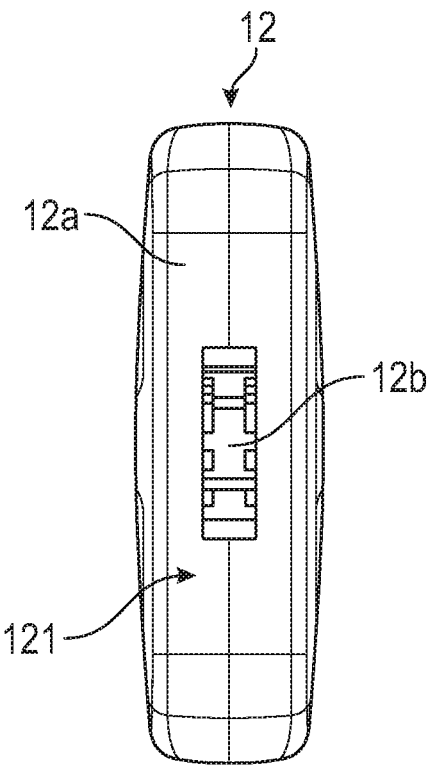
Figure 4:
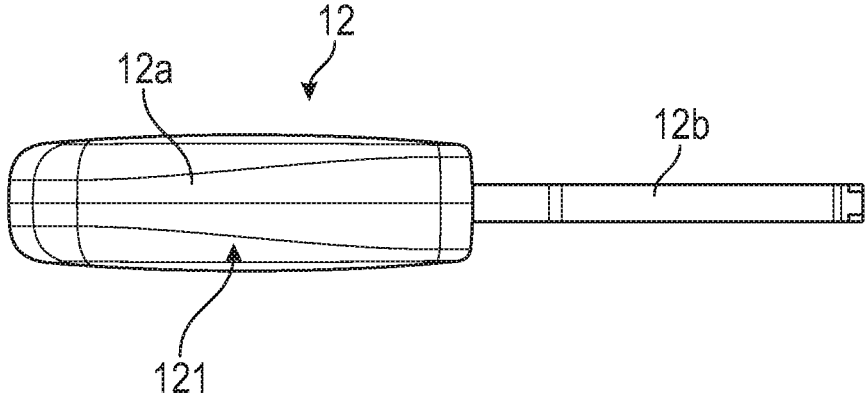

Therefore, the cylinder lock 11 may include a body 111 in which is mounted a plug 112 (the plug 112 may be referred to as the lock cylinder and the terms are used synonymously herein)—see FIG. 1, for example. The body 111 and plug 112 may define channels or passages for pins, plates, discs, or wafers, or the like, which define the keying of the cylinder lock 11.

Insertion of the key 12 into a key aperture 113 of the cylinder lock 11 causes the key 12 to interact with the pins, plates, discs, or wafers, or the like, in order to free the plug 112 for rotation with respect to the body 111. Typically, for example, the interaction of the key 12 with the pins, plates, discs, or wafers, or the like, causes the pins, plates, discs, or wafers, or the like, to move within the plug 112 and body 111 such that an end of the pins, plates, discs, or wafers, or the like, align with the interface between the body 111 and the plug 112 (i.e. without any of the pins, plates, discs, or wafers, or the like, bridging that interface). This will enable rotation of the plug 112 within the body 111. In some versions there may be one or more pins, plates, discs, or wafers, or the like which do bridge that interface and still permit rotation of the plug 112 with respect to the body 111 (e.g. for use in retaining the plug 112 in the body 111).

The cylinder lock 11 may include a member 114 such as a shaft, gear, and/or cam which is configured for rotation with the plug 112 with respect to the body 111. The member 114 is configured, when the cylinder lock 11 is fitted within a lock system 100, such that its movement with respect to the body 111 engages and actuates part of the lock system 100 between different states thereof. These states (or statuses) may include, for example, one or more of locked, unlocked, latched, and/or unlatched, for example.

The cylinder lock 11 may include a thumbturn 116 or the like (see FIG. 11, for example), and may therefore be a thumbturn cylinder lock 11. The thumbturn 116 may be attached to the cylinder lock 11 as is known in the art. The thumbturn 116 may be configured for rotation with respect to the body 111. The member 114 and/or plug 112 may be configured for rotation with the thumbturn 116 with respect to the body 111. The thumbturn 116 may, therefore, be used to set a state of the lock system 100 as described above (e.g. locked, unlocked, latched, and/or unlatched). In other words, the thumbturn 116 may be configured to operate the cylinder lock 11. The thumbturn 116 may, therefore, enable a user to operate the cylinder lock 11 without using the key 12. The thumbturn 116 may be located at an end of the cylinder lock 11, may protrude from the cylinder lock 11, and may be shaped and/or sized for manual grasping and/or rotation thereof.

There are a wide variety of known configurations of cylinder lock 11 and key 12 with which versions of the present technology are applicable. In general, the common features of such cylinder lock 11 and keys 12 are that the key 12 is receivable by the key aperture 113 and is rotatable with respect to the body 111 of the cylinder lock 11 (when the correct key 12 is used) to operate the cylinder lock 11. The cylinder lock 11 may additionally or alternatively be operable by the thumbturn 116 as described, e.g. the thumbturn 116 may be rotatable with respect to the body 111 of the cylinder lock 11 to operate the cylinder lock 11. Operation of the cylinder lock 11 is configured to cause actuation of the lock system 100 in which the cylinder lock 11 is fitted between states (e.g. locked, unlocked, latched, and/or unlatched, for example). The cylinder lock 11 is fitted to the lock system 100 and so rotation of the thumbturn 116 and/or key 12 (when received in the key aperture 113) with respect to the body 111 is also rotation with respect to parts of the lock system 100. Indeed, this rotation is also rotation with respect to parts of the structure (e.g. door or window (herein referred to as examples of moveable panels)) to which the lock system 100 is fitted.

A prevalent form of cylinder lock 11 in use at present is a Euro cylinder lock 11 (such as shown in FIGS. 1 and 11, for example). Such Euro cylinder locks 11 have a generally standardised external profile and can come in a number of defined configurations (e.g. a single or half size). Such Euro cylinder locks 11 may include single cylinder locks, double cylinder locks, and/or thumbturn cylinder locks, for example. There is some variation between the specific sizes of Euro cylinder locks 11 made by different manufacturers. However, the aim of this general standardisation is to enable interchangeability, such that a Euro cylinder lock 11 from one manufacturer may be replaced with one of another manufacturer. Moreover, the manufacturer of the lock system 100 in which the Euro cylinder lock 11 is fitted need not, therefore, be the same as the manufacturer of the Euro cylinder lock 11. This enables, for example, simple rekeying of lock systems 100 and even upgrading (or downgrading) of the cylinder lock 11. For example, a double cylinder lock 11 may be replaced with a thumbturn cylinder lock 11 and vice versa. As alluded to, therefore, Euro cylinder locks 11 may have a generally standardised external profile but the internals of the Euro cylinder lock 11 need not be the same as each other. For example, different Euro cylinder locks 11 may use different numbers of pins, plates, discs, or wafers, or the like, and/or may use different combinations of other security features. Accordingly, different Euro cylinder locks 11 may provide different levels of security and may have different potential vulnerabilities—e.g. susceptibility to picking, bumping, and/or snapping. The same is true of other generally standardised forms of cylinder lock 11 and the above discussion in relation to Euro cylinder locks 11 applies equally to other standardised forms of cylinder lock 11. Indeed, a particular manufacturer may even have their own proprietary set of interchangeable cylinder locks 11 with different features (i.e. the advantages of such interchangeability are not limited to standardisation across multiple manufacturers).

Versions of the present technology are described with reference to a Euro cylinder lock 11; however, this is for convenience. Versions of the technology can be used with other forms of cylinder lock 11 (which may be interchangeable or not). It will be appreciated, however, that some aspects of the present technology are beneficial when used with interchangeable cylinder locks 11 and may enable retrofitting of parts of the disclosed technology to existing lock systems 100 (which may have even been made prior to the development of the present technology).

As Euro cylinder locks 11 are known and are used herein as an example, a detailed description of such cylinder locks 11 is not provided. In general, however, such cylinder locks 11 (and some others) include an elongate body 111 in which the plug 112 is fitted. The body 111 of the Euro cylinder lock 11 has a round portion (in which the plug 112 is fitted) and an extension (which extends radially from the round portion and which generally extends along a length of the elongate body 111). Along the length of the elongate body 111 there is provided a member 114 in the form of a cam in this instance. As explained herein, rotation of the plug 112 with respect to the body 111 (e.g. by rotation of the thumbturn 116 and/or when the correct key 12 is received by the key aperture 113) causes movement of the member 114 to actuate the lock system 100 in which the cylinder lock 11 is fitted. The features of the Euro cylinder lock 11 may be common with other forms of cylinder lock 11 and are not necessarily unique to Euro cylinder locks 11.

In some versions of the technology, a magnet 115 is provided.

The magnet 115 may be fitted to the cylinder lock 11 and, in particular, may be fitted to the body 111 of the cylinder lock 11 such that rotation of the thumbturn 116 and/or key 12 (when received by the key aperture 113) with respect to the body 111 is also rotation of the thumbturn 116 and/or key 12 with respect to the magnet 115.

In some versions, such as those using a Euro cylinder lock 11, the magnet 115 may be fitted within the extension of the body 111. The magnet 115 may be radially offset from the key aperture 113 and/or thumbturn 116. The magnet 115 may be radially offset with respect to the plug 112. The magnet 115 may be located at or towards a first end of the cylinder lock 11 and this may be at or towards a first end of the body 111, for example. The first end of the cylinder lock 11 (and/or body 111) may be the end thereof by which the key aperture 113 is accessed for insertion of the key 12 in normal use (and normal use may be in use to actuate the lock system 100 between its different states as described herein)—see FIG. 5, for example. The first end of the cylinder lock 11 (and/or body 111) may be the end thereof at which the thumbturn 116 is located—see FIG. 11, for example. This first end may also be described as an exposed end (as it may be generally exposed to allow access to the key aperture 113 and/or thumbturn 116).

In some versions of the cylinder lock 11 there may be two key apertures 113 each of which is provided at a respective opposing end of the cylinder lock 11. In such versions, the described configuration of the cylinder lock 11 (e.g. with respect to the key 12 and key aperture 113) may be duplicated for either end thereof (i.e. there may be two sets of pins, plates, discs, or wafers, or the like provided, one set for each end but, typically, the same key 12 will operate both sides of the cylinder lock 11), with a common member 114. As will be appreciated such configurations allow a single cylinder lock 11 to be used from either side of a door or window. Such arrangements may, therefore, have two exposed ends, which oppose each other across the length of the cylinder lock 11.

In some versions of the cylinder lock 11 there may be two thumbturns 116 each of which is provided at a respective opposing end of the cylinder lock 11. In such versions, each thumbturn 116 may be configured to operate a common member 114. As will be appreciated such configurations allow a single cylinder lock 11 to be used from either side of a door or window. Such arrangements may, therefore, have two exposed ends, which oppose each other across the length of the cylinder lock 11. Such versions may be suitable in a low-security environment, such as for use on internal doors (e.g. bathroom doors), for example.

In some versions of the cylinder lock 11 there may be a key aperture 113 and a thumbturn 116, with each provided at a respective opposing end of the cylinder lock 11. The key 12 and thumbturn 116 may, therefore, be configured to operate a common member 114. As will be appreciated such configurations allow a single cylinder lock 11 to be used from either side of a door or window, with different levels of security provided at each end of the cylinder lock 11. Such arrangements may, therefore, have two exposed ends, which oppose each other across the length of the cylinder lock 11. Such versions may be suitable for doors or windows requiring a higher level of security on one side, such as external doors or windows, for example, where the cylinder lock 11 may be arranged such that the thumbturn 116 faces a building interior and the key aperture 113 faces a building exterior.

In versions with two exposed ends, each end may be associated with its own magnet 115 and the described arrangement with respect to the magnet 115 may be duplicated for each exposed end. The description will concentrate on the arrangement at one such end, for brevity, but it should be understood that the arrangement may be provided at both of two exposed ends of the cylinder lock 11.

In some versions, the magnet 115 is fitted to a magnet bore 115a defined by the cylinder lock 11 (e.g. by the body 111)—see FIGS. 1, 11, and 15, for example. The magnet bore 115a may be configured (e.g. shaped and sized) to receive the magnet 115. The magnet 115 may be cylindrical and so the magnet bore 115a may have a circular cross-section. However, the magnet 115 could have a rectangular or square or triangular or pentagonal or hexagonal cross-section, for example, and the magnet bore 115a could be correspondingly shaped. The magnet 115 and magnet bore 115a may be configured (e.g. sized) such that the magnet 115, when so received by the magnet bore 115a, does not extend substantially beyond the confines of the body 111 of the cylinder lock 11. In some versions, the magnet 115 and magnet bore 115a may be configured (e.g. sized) such that when the magnet 115 is received by the magnet bore 115a, the cylinder lock 11 substantially retains the external profile of a Euro cylinder lock 11, for example.

The magnet bore 115a may have a length and a width (which may be a diameter). The length of the magnet bore 115a may extend across a width of the exposed end of the cylinder lock 11 and may be perpendicular to the extension of the body 111 (in relation to cylinder locks 11 having such extensions). The length of the magnet bore 115a may be perpendicular to a depth of the key aperture 113 (and so to a rotational axis of the plug 112). The length of the magnet bore 115a may be perpendicular to a rotational axis of the key 12 when the key 12 is received by the key aperture 113. The length of the magnet bore 115a may be perpendicular to a rotational axis of the thumbturn 116. The magnet bore 115a may be distanced from the rotational axis of the plug 112 and/or the key 12 (and the key 12 configured) such that a head (i.e. bow) 12a of the key 12 passes the magnet bore 115a or a part thereof when it is rotated (with the key 12 received by the key aperture 113), although this need not be the case. The magnet bore 115a may be distanced from the rotational axis of the thumbturn 116 (and the thumbturn 116 configured) such that a part of the thumbturn 116 passes the magnet bore 115a or a part thereof when the thumbturn 116 is rotated, although this need not be the case.

The magnet 115 may have a length and a width (which may be a diameter). The length of the magnet 115 (when fitted to the cylinder lock 11) may extend across a width of the exposed end of the cylinder lock 11 and may be perpendicular to the extension of the body 111 (in relation to cylinder locks 11 having such extensions). The length of the magnet 115 (when fitted) may be perpendicular to a depth of the key aperture 113 (and so to a rotational axis of the plug 112). The length of the magnet 115 (when fitted) may be perpendicular to a rotational axis of the key 12 when the key 12 is received by the key aperture 113. The length of the magnet 115 (when fitted) may be perpendicular to a rotational axis of the thumbturn 116. The magnet 115 (when fitted) may be distanced from the rotational axis of the plug 112 and/or the key 12 (and the key 12 configured) such that a head 12a of the key 12 passes the magnet 115 or a part thereof when it is rotated (with the key 12 received by the key aperture 113), although this need not be the case. The magnet 115 (when fitted) may be distanced from the rotational axis of the thumbturn 116 (and the thumbturn 116 configured) such that a part of the thumbturn 116 passes the magnet 115 or a part thereof when the thumbturn 116 is rotated, although this need not be the case.

In some versions, there may be multiple magnets 115 fitted to the cylinder lock 11. As discussed above, the cylinder lock 11 may have two exposed ends and there may be a magnet 115 provided at each end in the same manner as described herein (e.g. above). There may, therefore, be a magnet bore 115a provided at each exposed end of the cylinder lock 11—see FIGS. 11 and 15, for example. In some versions, however, there may be multiple magnets 115 at a single end of the cylinder lock 11. In such versions, each magnet 115 may be provided in a respective magnet bore 115a. In such versions, a first of the magnets 115 may be offset from a second of the magnets 115. This offset may be an offset in radial distance from the axis of rotation of the thumbturn 116 and/or plug 112 and/or key 12 (when received by the key aperture 113) and/or may be an angular offset with respect to that axis.

The magnet 115 may be configured such that its poles are at opposing ends along the length thereof (e.g. with the North pole at one end and the South pole at the other, opposing, end across the length of the magnet 115). In some versions, the magnet 115 is configured such that the poles are separated across the width (e.g. diameter) of the magnet 115 (e.g. so that the North pole is extends between the two ends of the magnet 115 on one side of the magnet 115 and the South pole also extends between the two ends of the magnet 115 on an opposing side of the magnet 115).

In some versions, the cylinder lock 11 is provided with the magnet bore 115a for later retrofitting of the magnet 115 within the magnet bore 115a. In some versions, the magnet 115 is secured inside the magnet bore 115a with an adhesive or, for example, a plug which fits to an open end of the magnet bore 115a with the magnet 115 received by the magnet bore 115a and inhibited from removal therefrom by the plug.

The magnet 115, in some versions, need not be provided in the cylinder lock 11. In some versions, the magnet 115 is fitted to another part of the lock system 100. For example, the magnet 115 may be fitted to a housing 100a of the lock system 100 which is adjacent the exposed end of the cylinder lock 11.

In some versions, the magnet bore 115a is accessible from the exposed end of the cylinder lock 11. In some versions, the magnet bore 115a is accessible from a side of the cylinder lock 11 and so not accessible when the cylinder lock 11 is fitted to a lock system 100. The former versions may enable relatively straightforward retrofitting of the magnet 115 without the need to dismantle the lock system 100. The latter versions may help to ensure that the magnet 115 is securely held with a reduced risk of tampering.

The magnet 115 may be fitted to the lock system 100 (e.g. to the cylinder lock 11) in such a manner that the key 12 (or a part thereof), when received by the key aperture 113, passes through the magnetic field of the magnet 115.

The magnet 115 may be fitted to the lock system 100 (e.g. to the cylinder lock 11) in such a manner that the thumbturn 116 (or a part thereof) lies in the magnetic field of the magnet 115. The magnet 115 may be fitted to the lock system 100 (e.g. to the cylinder lock 11) in such a manner that the thumbturn 116 (or a part thereof) passes through the magnetic field of the magnet 115 when the thumbturn 116 is rotated.

Figure 17A:
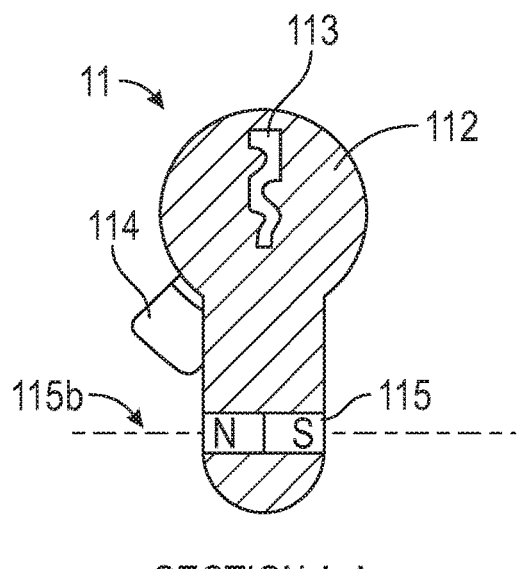
FIG. 17$a$ is a sectional view of the cylinder lock of FIG. 16 taken along the line A-A.
Figure 17B:
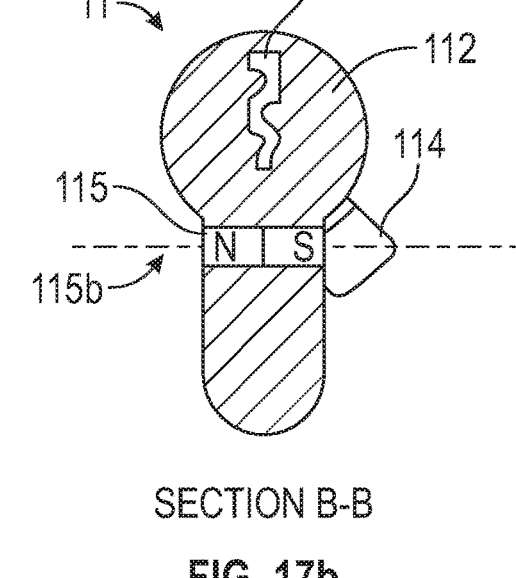

In some versions, the magnet 115 may be configured such that the magnetic axis 115b (i.e. the straight line joining the two poles of the magnet 115—see FIGS. 17a and 17b, for example) is perpendicular to the extension of the body 111

(in relation to cylinder locks 11 having such extensions). The magnetic axis 115b may be perpendicular to a depth of the key aperture 113 (and so to a rotational axis of the plug 112). The magnetic axis 115b may be perpendicular to a rotational axis of the key 12 when the key 12 is received by the key aperture 113. The magnetic axis 115b may be perpendicular to a rotational axis of the thumbturn 116. The magnetic axis 115b may be distanced from the rotational axis of the plug 112 and/or the key 12 (and the key 12 configured) such that a head (i.e. bow) 12a of the key 12 passes the magnetic axis 115b or a part thereof when it is rotated (with the key 12 received by the key aperture 113), although this need not be the case. The magnetic axis 115b may be distanced from the rotational axis of the thumbturn 116 (and the thumbturn 116 configured) such that a part of the thumbturn 116 passes the magnetic axis 115b or a part thereof when the thumbturn 116 is rotated, although this need not be the case. In some versions, a magnet ring 115r may be provided, and the magnet ring 115r may include the magnet 115 (see e.g. FIG. 22a and FIG. 22b). The magnet ring 115r may include a generally annular component. In some versions the magnet ring 115r may, therefore, have a generally circular form, but in some versions the magnet ring 115r may have a generally square, rectangular, or other geometric form. The magnet ring 115r may define a closed loop. The magnet ring 115r may be configured for attachment to a part of a handle associated with the lock apparatus 1 (and e.g. with the cylinder lock 11). The handle may, therefore, be configured for use with the lock apparatus 1, and may in particular be used to open a door (or, more generally, a leaf 30) to which the lock apparatus 1 is fitted. The handle may include a handle spindle, and the magnet ring 115r may be configured to be fitted around the handle spindle. The magnet ring 115r may, therefore, be slid onto the handle spindle. The magnet ring 115r may be configured to receive at least part of the handle spindle, such as through the loop formed by the magnet ring 115r.

The magnet ring 115r may include the magnet 115. In some versions, a portion of the magnet ring 115r may provide the magnet 115. In some versions, substantially all of the magnet ring 115r may provide the magnet 115. The magnet ring 115r may define an axis through the loop formed by the magnet ring (e.g. an axis of rotational symmetry). The boundary between the north and south poles of the magnet in the magnet ring 115r may run parallel to the axis of the magnet ring 115r. The magnet ring 115r may, therefore, include a first face configured to face the lock apparatus 1, and a second face (opposite the first face) configured to face an actuation member (see below). The first and/or second face may, therefore, include a portion defining a magnetic north pole and a portion defining a magnetic south pole. Rotation of the actuation member relative to the magnet ring 115r may, therefore, result in a part of the actuation member detecting a change in polarity of the magnetic field produced by the magnet ring 115r, as described below.

Figures 22A, 22B:
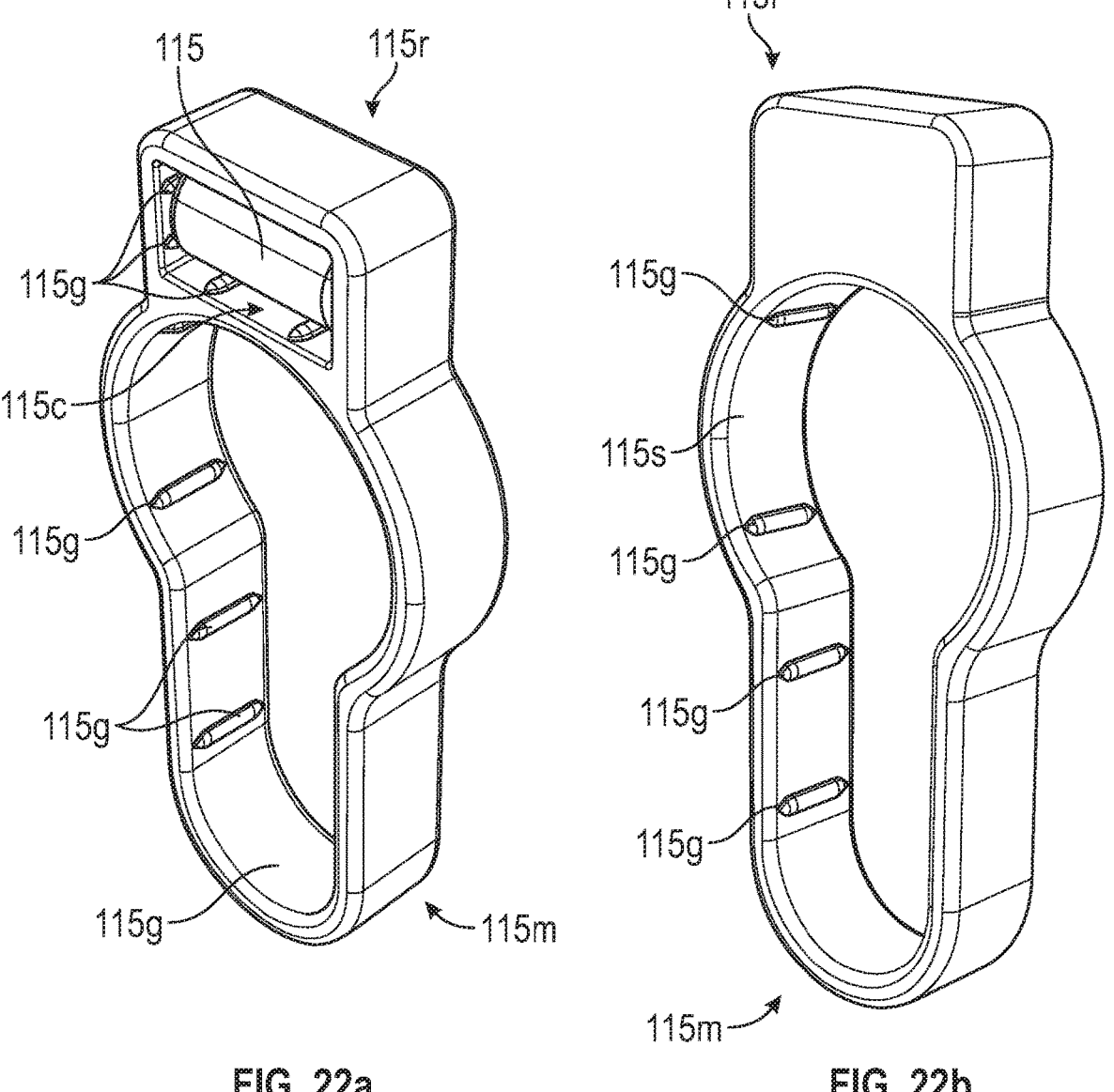
FIG. 22$a$ is a front perspective view of a magnet ring.

An example of a magnet ring 115r is shown in FIG. 22a and FIG. 22b.

The magnet ring 115r may include a compressible, stretchable, resilient and/or deformable material. The magnet ring 115r may include a rubber or synthetic rubber material, for example, and in some versions all or part of the magnet ring 115r may be formed from a rubber or a synthetic rubber material. In some versions all or part of the magnet ring 115r may be formed from a plastics material, or any other resiliently deformable material. In other versions the magnet ring 115r or a part thereof may be formed from a metal or alloy thereof.

The magnet ring 115r may be configured to mate with a part of the cylinder lock 11. The magnet ring 115r may include a mating portion 115m. The mating portion 115m may have a complementary shape to that of the cylinder lock 11, or a part thereof. The mating portion 115m may therefore be configured to mate with a part of the cylinder lock 11. The mating portion 115m may define a closed loop, for example, and the shape of the loop may correspond to an exterior profile (e.g. shape) of the cylinder lock 11 (e.g. a perimeter of the cylinder lock 11). In some versions the mating portion 115m may define a closed loop that does not directly correspond to an exterior profile of the cylinder lock 11, but which is deformable into a shape corresponding to the exterior profile of the cylinder lock 11. The mating portion 115m may, for example, define a generally circular or elliptical loop that may be deformable to mate with the part of the cylinder lock 11. In some versions the mating portion 115m may define a loop that is not closed, but that substantially follows the profile of the cylinder lock 11. The mating portion 115m may, therefore, include a cut-out and/or gap, which may allow the mating portion 115m to flex, which may allow the mating portion 115m to mate with the part of the cylinder lock 11.

The magnet ring 115r may mate with the cylinder lock 11 (or part thereof) by a friction fit. The magnet ring 115r may include a surface 115s. The mating portion 115m may include the surface 115s. The surface 115s may be an inner surface 115s configured to mate with the part of the cylinder lock 11 (e.g. the perimeter of the cylinder lock 11). The part of the cylinder lock 11 may, therefore, be at least partially received by the magnet ring 115r (e.g. by the mating portion 115m). In use, therefore, the surface 115s may contact the part of the cylinder lock 11. The surface 115s may therefore abut the part of the cylinder lock 11 in use.

The resilience of the magnet ring 115r may force the magnet ring 115r into contact with the part of the cylinder lock 11, which may ensure a secure mating of the magnet ring 115r with the cylinder lock 11. For example, in a rest configuration a total length of the surface 115s may be smaller than a total length of the exterior profile of the cylinder lock 11, such that the magnet ring 115r must be stretched to fit over the cylinder lock 11 or part thereof. The resilience of the magnet ring 115r may, therefore, bias the magnet ring 115r towards the rest configuration, thereby exerting a compressive force on the cylinder lock 11 and securely mating the magnet ring 115r to the cylinder lock 11.

The magnet ring 115r may include one or more grips 115g. The grips 115g may be located on the mating portion 115m and may be located on the surface 115s. The grips 115g may, therefore, be configured to contact and/or abut the cylinder lock 11 in use. The grips 115g may be compressible and/or resilient. Mating of the magnet ring 115r with the cylinder lock 11 may therefore compress the grips 115g, which may accordingly exert a force on the cylinder lock 11, which may ensure secure mating of the magnet ring with the cylinder lock 11. The grips 115g may include a rubber or synthetic rubber material, and may be formed from the rubber or synthetic rubber material. In such versions, the mating portion 115m (and e.g. the loop defined thereby) may not be deformable, but the compression of the grips 115g may allow secure mating of the magnet ring 115r with the cylinder lock 11 (e.g. by sliding the mating portion 115m over the cylinder lock 11 or part thereof). The magnet ring 115r may include a magnet recess and/or cavity 115c. The magnet recess and/or cavity 115c may be configured to receive, at least partially, the magnet 115. In some versions the magnet 115 may be housed in the magnet recess and/or cavity 115c. The magnet recess and/or cavity 115c may include one or more grips 115g, which may be compressed by insertion of the magnet 115 into the magnet recess and/or cavity 115c. The grips 115g may therefore retain the magnet 115 in the magnet recess and/or cavity 115c. In some versions the magnet recess and/or cavity 115c may be deformable as described in relation to the mating portion 115m such that the magnet recess and/or cavity 115c may be deformed by insertion of the magnet 115 into the magnet recess and/or cavity 115c. The magnet recess and/or cavity 115c may then exert a compressive force on the magnet 115, which may retain the magnet 115 in the magnet recess and/or cavity 115c.

In some versions the magnet 115 may be sealed inside the magnet recess and/or cavity 115c.

The magnet recess and/or cavity 115c may be located adjacent the mating portion 115m. The magnet recess and/or cavity 115c may be configured such that the magnet 115 received thereby is oriented as described herein (e.g. with the magnetic axis 115b oriented as described herein). The magnet recess and/or cavity 115c may, therefore, be formed by a protrusion extending from the mating portion 115m, the protrusion defining the magnet recess and/or cavity 115c. In some versions the magnet recess and/or cavity 115c may be defined by a plurality of walls arranged around an empty space configured to receive the magnet 115.

In use, therefore, the magnet ring 115r may be slid onto an exposed end of the cylinder lock 11. The magnet ring 115r may therefore house the magnet 115 adjacent the cylinder lock 11.

Accordingly, the magnet 115 may be housed outside the cylinder lock 11. The magnet ring 115r may, therefore, be exposed when mated to the cylinder lock 11. In some versions, for security, the magnet ring 115r may be hidden behind a plate (e.g. escutcheon) when mated to the cylinder lock 11. The magnet ring 115r may, therefore, be retrofitted to an existing cylinder lock 11.

As described, in versions of the cylinder lock 11 with two exposed ends, each end may be associated with its own magnet 115 (and may therefore be associated with its own magnet ring 115r) and the described arrangement with respect to the magnet 115 may be duplicated for each exposed end. Furthermore, as described, the or each magnet bore 115a (and corresponding magnet 115) may be distanced from the rotational axis of the plug 112 and/or key 12 and/or thumbturn 116.

In some versions, a first magnet bore 115a (and corresponding magnet 115) at a first end of the cylinder lock 11 may be located a first distance away from the rotational axis of the plug 112 and/or key 12 and/or thumbturn 116. A second magnet bore 115a (and corresponding magnet 115) at a second end of the cylinder lock 11 may also be located the first distance away from the rotational axis of the plug 112 and/or key 12 and/or thumbturn 116. The first and second magnet bores 115a (and corresponding magnets 115) may, therefore, be equidistant from the rotational axis of the plug 112 and/or key 12 and/or thumbturn 116.

However, in some versions, the first and second magnet bores 115a (and corresponding magnets 115) may be offset with respect to each other. Accordingly, the first magnet bore 115a (and corresponding magnet 115) at the first end of the cylinder lock 11 may be located a first distance away from the rotational axis of the plug 112 and/or key 12 and/or thumbturn 116. The second magnet bore 115a (and corresponding magnet 115) at the second end of the cylinder lock 11 may be located a second distance away from the rotational axis of the plug 112 and/or key 12 and/or thumbturn 116. The first and second distances may, therefore, be different.

Providing offset magnet bores 115a may, in some versions, provide a means to determine which side of the cylinder lock 11 a key 12 has been inserted into, for example, as described below.

The magnets 115 at the first and second ends of the cylinder lock 11 may be arranged such that their magnetic axes 115b are substantially parallel. In some versions, the magnets 115 may be oriented such that their like poles face in substantially the same direction, e.g. such that the North poles face each other across the length of the cylinder lock 11 and such that the South poles face each other across the length of the cylinder lock 11. When viewed by a user from an exposed end of the cylinder lock 11, the two magnets may therefore appear in the same magnetic orientation (e.g. both North poles may appear on the user's right).

The lock system 100 may be fitted to a window or door, for example. The lock system 100 may include one or more bolts 101 (e.g. a deadbolt and/or a latch bolt) which are configured to engage or be at least partially received by a keep (which may form part of the lock system 100) to inhibit or substantially prevent the opening (or further opening) of the window or door, in the normal manner. Actuation of the lock system 100 between its states may cause retraction or extension of the or each bolt 101 to engage or disengage the keep. There are many different configurations of lock system 100 to which the technology described herein may be applied. For example, some lock systems 100 may include one or more hooks or pins instead of bolts 101. The technology described herein may be applied to various known configurations of lock system 100. In general, many or all such lock systems 100 may be actuated between their various states (e.g. locked, unlocked, latched, and/or unlatched) by movement of the key 12 and/or thumbturn 116 with respect to a part of the lock system 100 (such as with respect to the body 111 of the cylinder lock 11) and that movement may be rotational movement about a respective rotational axis.

The key 12, as described, may include a shaft 12b and a head (i.e. bow) 12a (see FIGS. 2-9, for example). The shaft 12b extends from the head 12a. The shaft 12b may be configured to be received by the key aperture 113 and keyed to correspond with the cylinder lock 11. In other words, the key 12 (and, in particular, the shaft 12b) may be configured to interact with the pins, plates, discs, or wafers, or the like, so as to enable rotation of the key 12 (and, in some versions, therefore also the plug 112) with respect to a part of the cylinder lock 11 (such as the body 111). This rotation may, when the cylinder lock 11 is fitted to a lock system 100, cause actuation of the lock system 100 between its various states. The precise configuration of the shaft 12b may depend, therefore, on the configuration of the cylinder lock 11 and any number of different configurations are envisaged.

The head 12a may be shaped and sized so as to enable a user to turn the key 12 with respect to the part of the cylinder lock 11. The head 12a may be shaped and sized so as to enable a user to turn the key 12 manually with respect to the part of the cylinder lock 11. The head 12a may also, of course, enable the user to insert and remove the shaft 12b from the key aperture 113. Typically, therefore, the head 12a is wider than the shaft 12b and may be longer, as long as, or shorter than the shaft 12b. The shaft 12b may be relatively thin and the head 12a may be thicker than the shaft 12b.

The head 12a may include a key housing 121. The key housing 121 may be a body defining a chamber in which one or more components of the key 12 may be housed. The key housing 121 (e.g. the body) may essentially provide the head 12a and may be mounted to the key shaft 12b. The key shaft 12b may, therefore, be mounted to the key housing 121 and may extend therefrom.

The thumbturn 116 may include a thumbturn housing 122. The thumbturn housing 122 may be a body defining a chamber in which one or more components of the thumbturn 116 may be housed. The thumbturn housing 122 (e.g. the body) may essentially provide the thumbturn 116.

As will be understood, both the key 12 and the thumbturn 116 provide a means for a user to actuate the cylinder lock 11 (and, generally, the lock system 100). Accordingly, the lock apparatus 1 may include an actuation member. The actuation member may be the key 12 and/or the thumbturn 116. In other words, the key 12 and the thumbturn 116 are examples of actuation members. The actuation member may be configured to operate the cylinder lock 11 (e.g. via rotation of the actuation member).

Figure 6:
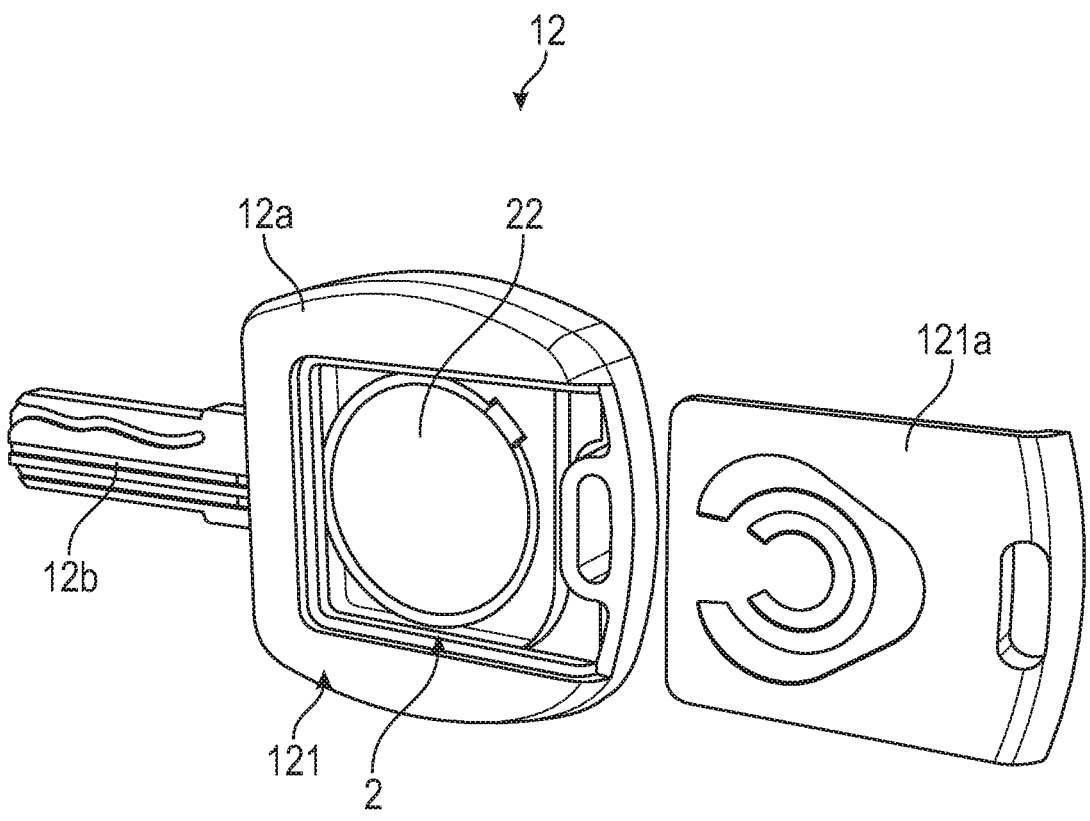
FIG. 6 is a view of a key with a cover removed.
Figure 7:
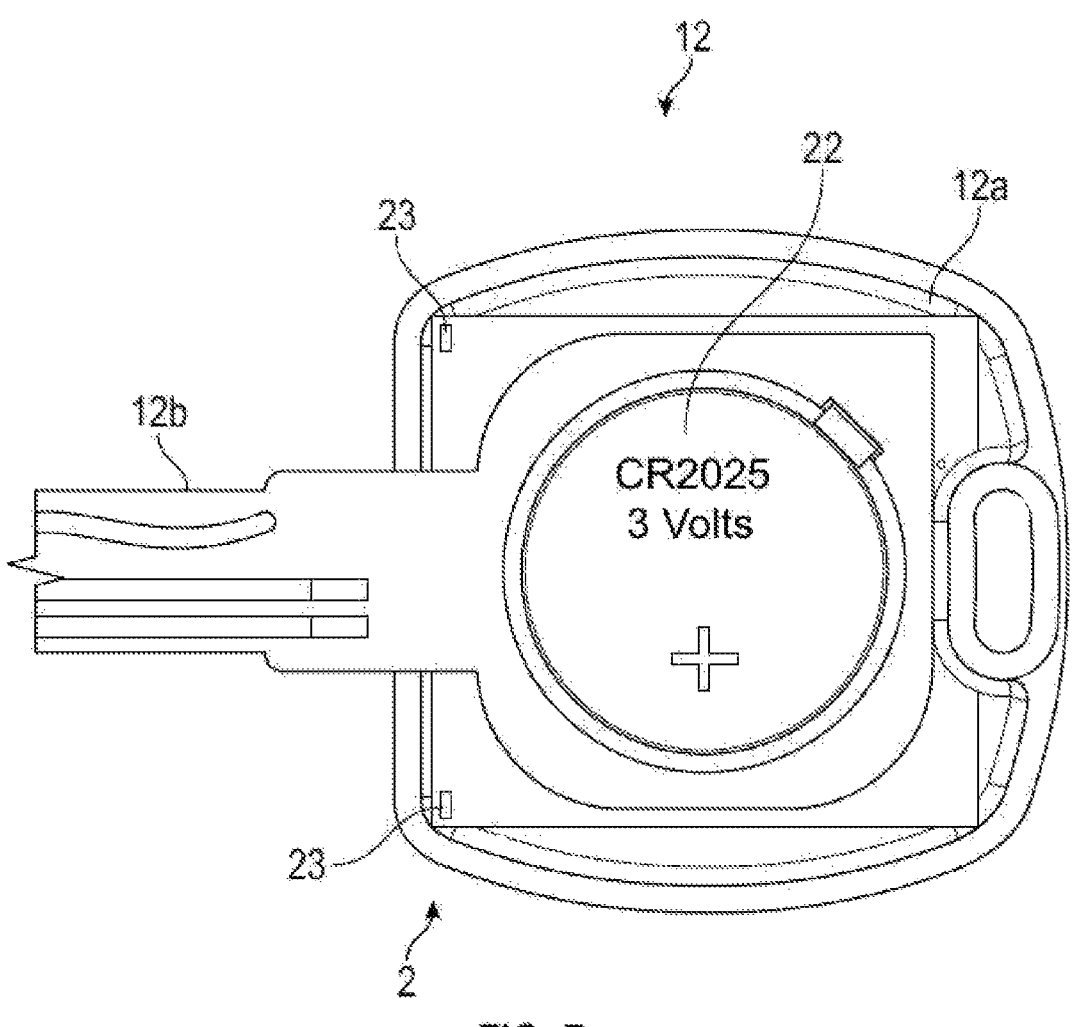
FIG. 7 is a view of a key.
Figure 8:
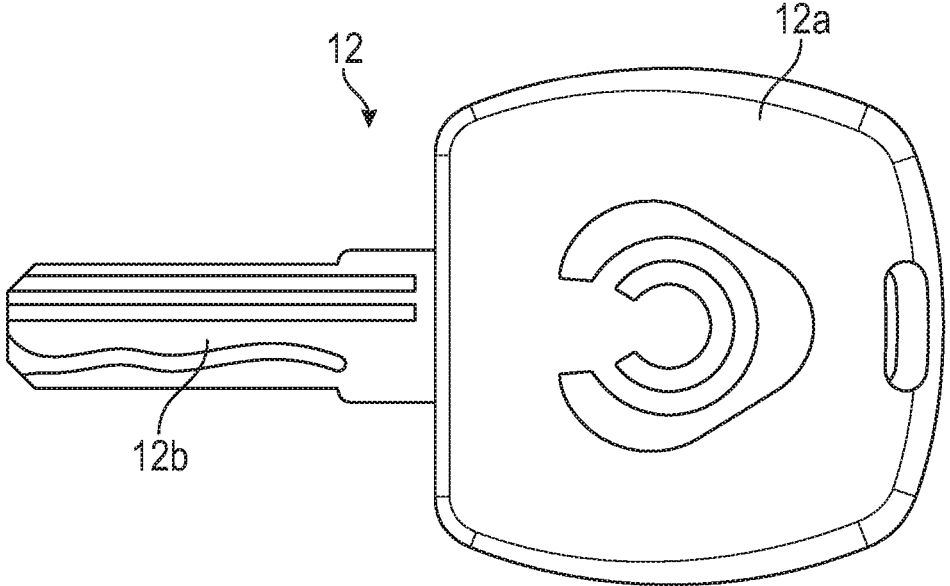
FIGS. 8 and 9 are external views of keys.
Figure 9:
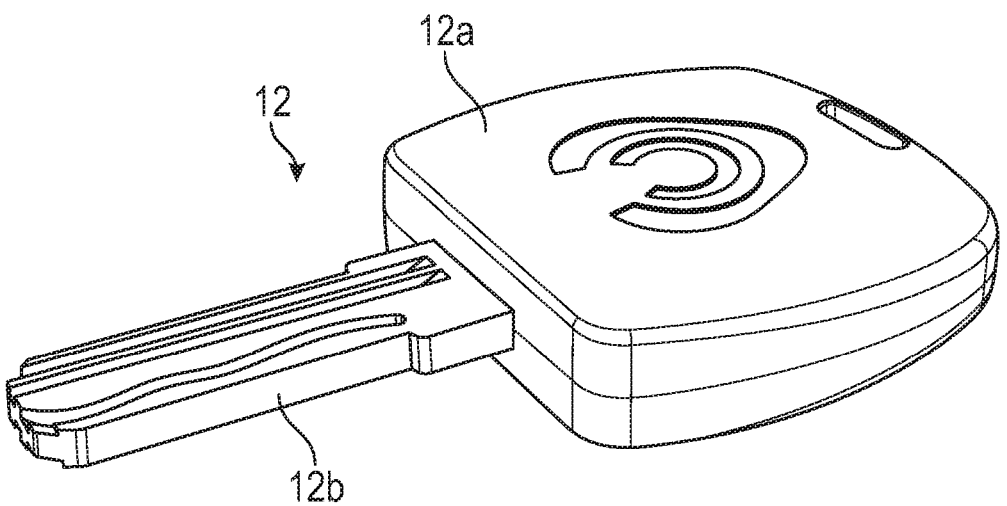
Figure 10:
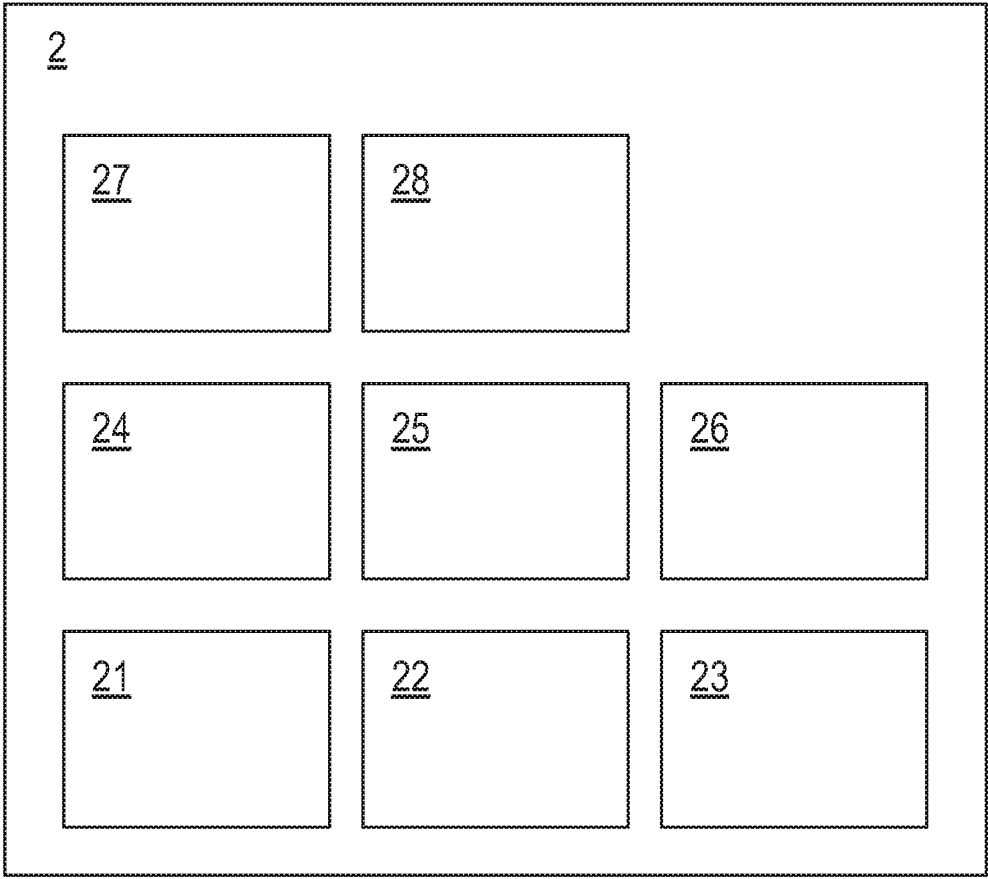
FIG. 10 shows a schematic view of a smart actuation member circuit.

The actuation member (e.g. the key 12 and/or thumbturn 116) may be configured to house a smart actuation member circuit 2 (see FIGS. 6, 7, and 10, for example). The key housing 121 and/or thumbturn housing 122 may be configured to house the smart actuation member circuit 2. The smart actuation member circuit 2 may be a smart key circuit 2. The smart actuation member circuit 2 may be a smart thumbturn circuit 2. The smart actuation member circuit 2 may include one or more of: a processor or controller 21, a power source 22, one or more sensors 23, a transmitter 24, a receiver 25, and a location sensor 26.

The processor or controller 21 may be configured to control the operation of the smart actuation member circuit 2 and may receive signals from the or each sensor 23. The processor or controller 21 may be configured to perform one or more operations on the signals from the or each sensor 23 and, as a result, instruct the transmitter 24 to transmit a signal to a remote location. The receiver 25 may be configured to receive one or more signals from a remote location which may cause one or more operations of the processor or controller 21 to be altered. The power source 22 may provide electrical power to enable the operation of the processor or controller 21, and/or the one or more sensors 23, and/or the transmitter 24, and/or the receiver 25.

The power source 22 may be a battery and this battery may be a coin cell type of battery, for example. The battery may be replaceable and, with this in mind, a cover 121a of the key housing 121 may be removable (e.g. may be slid from the rest of the key housing 121 to expose at least part of the chamber and may provide access to the battery). Similarly, a cover of the thumbturn housing 122 may be removable (e.g. may be slid from the rest of the thumbturn housing 122 to expose at least part of the chamber and may provide access to the battery). In some versions, the key housing 121 is removable from the key shaft 12b—for example, the key housing 121 may be configured to be clipped to or around a part of the key shaft 12b or key head 12a. In some versions, the thumbturn housing 122 is removable from the thumbturn 116—for example, the thumbturn housing 122 may be configured to be clipped to or around a part of the thumbturn 116. The thumbturn housing 122 may, therefore, be retrofitted to an existing thumbturn 116, for example by clipping the thumbturn housing 122 to or around an existing thumbturn 116.

The transmitter 24 may be a wireless transmitter, for example. The wireless transmitter may be configured to transmit a signal to the remote location which may be a hub or computing device, for example. The transmitter 24 may be a radio transmitter, for example. The transmitter 24 may be a Zigbee, Z-Wave, Bluetooth or Wi-Fi transmitter, for example.

The receiver 25 may be a wireless receiver, for example. The wireless receiver may be configured to receive a signal from a remote location which may be a hub or computing device, for example. The receiver 25 may be a radio receiver, for example. The receiver 25 may be a Zigbee, Z-Wave, Bluetooth or Wi-Fi receiver, for example.

In some versions, the transmitter 24 and receiver 25 are combined and provided as a transceiver.

The or each sensor 23 may include one or more sensors configured to sense a magnetic field, which may include one or more Hall Effect sensors, one or more magnetometers, one or more Reed switches, or the like (these will be referred to herein, for simplicity, as magnetic field sensors). The or each sensor 23 may include one or more sensors configured to sense movement, such as an acceleration sensor (e.g. accelerometer), which may be a Piezoelectric or a capacitive acceleration sensor, for example. The or each sensor 23 may include one or more sensors configured to sense the proximity of a user's hand to the smart actuation member circuit 2, for example, and may be a capacitive sensor, for example. The or each sensor 23 may, therefore, include one or more sensors configured to sense the proximity of a user's hand to the key 12 and/or thumbturn 116 in which the smart actuation member circuit 2 is housed.

The processor or controller 21 is configured to receive one or more signals from the or each sensor 23 (i.e. sensor outputs) and to perform one or more responsive processes. This may include passing the sensor outputs to the transmitter 24 for transmission to the remote location. This may include performing some analysis of the sensor output and instructing the transmitter 24 to transmit different information to the remote location based on the combination(s) of sensor outputs received.

The receiver 25 may be used, for example, in handshaking communications between the transmitter 24 and the remote location. The receiver 25 may be used, for example, to receive one or more parameters from the remote location which are then provided to the processor or controller 21 in order to alter the operation thereof (e.g. in order to alter which combinations of sensor outputs cause what signal to be transmitted by the transmitter 24).

The smart actuation member circuit 2 (e.g. the smart key circuit 2) may be configured to sense one or more of: insertion or removal of the key 12 into the key aperture 113, rotation of the key 12 with respect to the lock system 100 in a first direction, rotation of the key 12 with respect to the lock system 100 in a second direction (opposing the first direction), and the degree of rotation of the key 12 with respect to the lock system 100. These may be generally referred to as actions of the key 12 with respect to the cylinder lock 11, for example.

It will be appreciated that rotation of the key 12 with respect to the lock system 100 may also be referred to as rotation of the key 12 with respect to the body 111 of the cylinder lock 11, or rotation of the plug 112 with respect to the body 111 (with the key 12 received by the key aperture 113), for example. The language is used interchangeably herein.

The smart actuation member circuit 2 (e.g. the smart thumbturn circuit 2) may be configured to sense one or more of: rotation of the thumbturn 116 with respect to the lock system 100 in a first direction, rotation of the thumbturn 116 with respect to the lock system 100 in a second direction (opposing the first direction), and the degree of rotation of the thumbturn 116 with respect to the lock system 100. These may be generally referred to as actions of the thumbturn 116 with respect to the cylinder lock 11, for example.

The smart actuation member circuit 2 can sense these operations of the key 12 and/or thumbturn 116 and cylinder lock 11 using the one or more sensors 23 and may use the magnet 115.

In some versions, there may be provided, therefore, at least one magnetic field sensor 23 as one of the one or more sensors 23. The magnetic field sensor 23 may be located within the key housing 121 and so as to be part of the key head 12a. In some versions, the magnetic field sensor 23 may be located at or towards a part of the head 12a or key housing 121 which is adjacent the key shaft 12b. In some versions, the magnetic field sensor 23 is located such that it is towards the cylinder lock 11 when the key 12 is received by the key aperture 113. The magnetic field sensor 23 may be located within the thumbturn housing 122 and so as to be part of the thumbturn 116. The magnetic field sensor 23 may be located such that it is towards the plug 112 (and may therefore be located at or towards a side of the thumbturn 116 and/or thumbturn housing 122 which is generally adjacent the plug 112). The magnetic field sensor 23 may be configured to sense the magnetic field of the magnet 115.

In versions having first and second offset magnet bores 115a (and corresponding magnets 115), the magnetic field sensor 23 may be used to determine which side of the cylinder lock 11 the key 12 has been inserted into. As will be appreciated, the first and second magnets 115 will each produce a magnetic field which can be sensed by the magnetic field sensor 23. The strength of the magnetic field sensed by the magnetic field sensor 23 may be used to determine whether the key 12 has been inserted into the first or second side of the cylinder lock 11 (e.g. by determining if the sensed magnetic field is caused by the first magnet 115 or the second magnet 115). The offset magnet bores 115a may, therefore, provide different magnetic field strengths at the magnetic field sensor 23 (e.g. with magnets 115 which are substantially the same). In some versions, a similar effect can be achieved, e.g. for the same purpose, with or without offset magnet bores 115a, using magnets 115 of respective different magnetic strengths (such that the sensed magnetic fields (by the magnetic field sensor 23) are different). In some versions, the magnets 115 are of different respective sizes (and may, therefore, have different magnet strengths (such that the sensed magnetic fields (by the magnetic field sensor 23) are different).

The sensing of a magnetic field by the magnetic field sensor 23 may cause the sensor 23 to send a signal to the processor or controller 21 indicating that the key 12 has been inserted into the cylinder lock 11 (i.e. with the key 12 received by the key aperture 113). In some versions, the magnetic field sensor 23 can sense the magnetic field strength and/or the magnetic field polarity. In some versions, the magnetic field sensor 23 is configured to send the magnetic field strength and/or polarity as sensed to the processor or controller 21.

In some versions, the magnetic field sensor 23 may be configured to ignore sensed magnetic fields which are outside of a range of magnetic field strengths and/or below a threshold field strength and/or above a threshold field strength and/or not of a particular field polarity. Alternatively, the processor or controller 21 may be configured to ignore received indications of sensed magnetic fields which are outside of a range of magnetic field strengths and/or below a threshold field strength and/or above a threshold field strength and/or not of a particular field polarity. This may be used to exclude sensed magnetic fields which are unlikely to be generated by the magnet 115.

The magnetic field sensor 23 may be positioned (and so the head 12*a* and/or the key housing 121 may be configured) so that it is generally adjacent the magnet 115 when the key 12 is first inserted into the cylinder lock 11 or removed therefrom. As is understood, typically, a key 12 may only be inserted into or removed from the cylinder lock 11 with the key 12 in particular orientations (or a single particular orientation) with respect to the cylinder lock 11.

Therefore, the presence or absence of the sensed magnetic field may be an indication that the key 12 has been inserted into the cylinder lock 11.

The rotation of the key 12 with respect to, for example, the lock system 100 (and/or the body 111 of the cylinder lock 11, which may also be rotation of the plug 112 with respect to the body 111) will cause movement of the magnetic field sensor 23 (and, for example, the head 12*a* and/or the key housing 121) with respect to the magnet 115. This may cause, for example, the sensed polarity and/or field strength of the magnetic field sensed by the magnetic field sensor 23 to change. The magnetic field sensor 23 and/or the processor or controller 21 may be configured to analyse the changes in the presence of a sensed magnetic field, and/or its polarity, and/or its field strength, (the processor or controller 21 receiving this information from the magnetic field sensor 23) to determine one or more of: removal (or insertion as mentioned above) of the key 12 from the cylinder lock 11, rotation of the key 12 with respect to the lock system 100 in a first direction, rotation of the key 12 with respect to the lock system 100 in a second direction (opposing the first direction), and the degree of rotation of the key 12 with respect to the lock system 100. Again, such rotation may be described in other manners—see above, for example.

The rotation of the thumbturn 116 with respect to, for example, the lock system 100 (and/or the body 111 of the cylinder lock 11, which may also be rotation of the plug 112 with respect to the body 111) may cause movement of the magnetic field sensor 23 (and, for example, the thumbturn housing 122) with respect to the magnet 115. This may cause, for example, the sensed polarity and/or field strength of the magnetic field sensed by the magnetic field sensor 23 to change. The magnetic field sensor 23 and/or the processor or controller 21 may be configured to analyse the changes in the presence of a sensed magnetic field, and/or its polarity, and/or its field strength, (the processor or controller 21 receiving this information from the magnetic field sensor 23) to determine one or more of: rotation of the thumbturn 116 with respect to the lock system 100 in a first direction, rotation of the thumbturn 116 with respect to the lock system 100 in a second direction (opposing the first direction), and the degree of rotation of the thumbturn 116 with respect to the lock system 100. Again, such rotation may be described in other manners—see above, for example.

In some versions, the or each sensor 23 may include at least two magnetic field sensors 23. A first of these magnetic field sensors 23 may be located on a first side of the shaft 12*b* and a second of these magnetic field sensors 23 may be located on a second side of the shaft 12*b*. The first or second magnetic field sensor 23 may be generally adjacent the magnet 115 when the key 12 is received by the key aperture 113 (i.e. inserted into the cylinder lock 11) and the other of the first and second magnetic field sensor 23 may be further away from the magnet 115. The other of the first and second magnetic field sensors 23 may be located such that it opposes the first or second magnetic field sensor 23 generally adjacent the magnet 115 across a portion of the key housing 121 and/or head 12*a* (see FIG. 7, for example). The first and second magnetic field sensors 23 may both face towards the cylinder lock 11 (e.g. an active face of each magnetic field sensor 23 may face towards the cylinder lock 11) with the key 12 received thereby. The first and second magnetic field sensors 23 may be equidistant from the rotational axis of the key 12 (and so, in some versions, of the plug 112). Accordingly, rotation of the key 12 with respect to the lock system 100 (see herein for other ways to describe this rotational movement) may cause the first magnetic field sensor 23 to move away from the magnet 115 and the second magnetic field sensor 23 to move towards the magnet 115. The sensed magnetic field strengths and/or polarities by the two magnetic field sensors 23 will change during this movement and this information can be used, e.g. by the processor or controller 21, to identify rotation of the key 12 and/or the direction and/or degree of rotation of the key 12, this rotation being with respect to, for example, the lock system 100 (and/or the body 111 and/or the magnet 115).

In some versions, the first magnetic field sensor 23 may be located at or towards a first side of the thumbturn 116 and/or thumbturn housing 122 and the second magnetic field sensor 23 may be located at or towards a second side of the thumbturn 116 and/or thumbturn housing 122. The first and second magnetic field sensors 23 may be located such that they oppose each other across a portion of the thumbturn 116 and/or thumbturn housing 122. The first and second magnetic field sensors 23 may both face towards the cylinder lock 11 (e.g. an active face of each magnetic field sensor 23 may face towards the cylinder lock 11). The first and second magnetic field sensors 23 may be equidistant from the rotational axis of the thumbturn 116 (and so, in some versions, of the plug 112). Accordingly, rotation of the thumbturn 116 with respect to the lock system 100 (see herein for other ways to describe this rotational movement) may cause the first magnetic field sensor 23 to move away from the magnet 115 and the second magnetic field sensor 23 to move towards the magnet 115. The sensed magnetic field strengths and/or polarities by the two magnetic field sensors 23 will change during this movement and this information can be used, e.g. by the processor or controller 21, to identify rotation of the thumbturn 116 and/or the direction and/or degree of rotation of the thumbturn 116, this rotation being with respect to, for example, the lock system 100 (and/or the body 111 and/or the magnet 115).

So, for example, in a version in which the magnetic axis 115*b* of the magnet 115 is oriented perpendicular to the rotational axis of the key 12 (and so, in some versions, the plug 112)—generally as depicted in FIGS. 17*a* and 17*b*, for example—the first of the magnetic field sensors 23 may sense a strong magnetic field and the second of the magnetic field sensors 23 may sense a weak magnetic field or no magnetic field, when the key 12 is first inserted into the cylinder lock 11.

Rotation of the key 12 and/or thumbturn 116 in a first direction about its respective axis of rotation (as described herein and so with respect to, for example, the lock system 100) may cause the first magnetic field sensor 23 to sense a decreasing magnetic field strength which may be of a particular polarity. Equally, however, the second magnetic field sensor 23 may sense an increasing magnetic field strength which may be of a polarity opposite to the particular polarity. Rotation of the key 12 and/or thumbturn 116 in the opposite direction will have the opposite effect. Continued rotation of the key 12 and/or thumbturn 116 such that one of the magnetic field sensors 23 passes the magnet 115 equally provides direction of rotation information based on the changing polarity of the sensed magnetic field by that magnetic field sensor 23. A decreasing magnetic field strength sensed by one of the magnetic field sensors 23 without a corresponding increase in the magnetic field strength sensed by the other magnetic field sensor 23 may indicate the key 12 is being removed from the cylinder lock 11 (indeed, it may be that the orientation of the key 12 required for removal means that it is a particular one of the two magnetic field sensors 23 which needs to have the larger sensed magnetic field, which then decreases, for removal of the key 12 to be the likely cause). The relative sensed magnetic field strength and/or, for example, the number of sensed rotations (e.g. sensed by virtue of the sensed passing of a magnetic field sensor 23 relative to the magnet 115 and the direction of that rotation) may provide the degree of rotation of the key 12 and/or thumbturn 116 with respect to the lock system 100 (see above for the different definitions of this rotation).

The processor or controller 21 may, therefore, be configured to receive this information (e.g. magnetic field strength, presence, and/or polarity information) from the or each magnetic field sensor 23 to determine whether the key 12 has been inserted or removed from the cylinder lock 11, rotated with respect to the lock system 100 (see above for the different ways to define this rotation), and/or the direction of this rotation and/or the degree of the rotation and the like. Equally, the processor or controller 21 may be configured to receive this information (e.g. magnetic field strength, presence, and/or polarity information) from the or each magnetic field sensor 23 to determine whether the thumbturn 116 has been rotated with respect to the lock system 100 (see above for the different ways to define this rotation), and/or the direction of this rotation and/or the degree of the rotation and the like.

Figure 18:
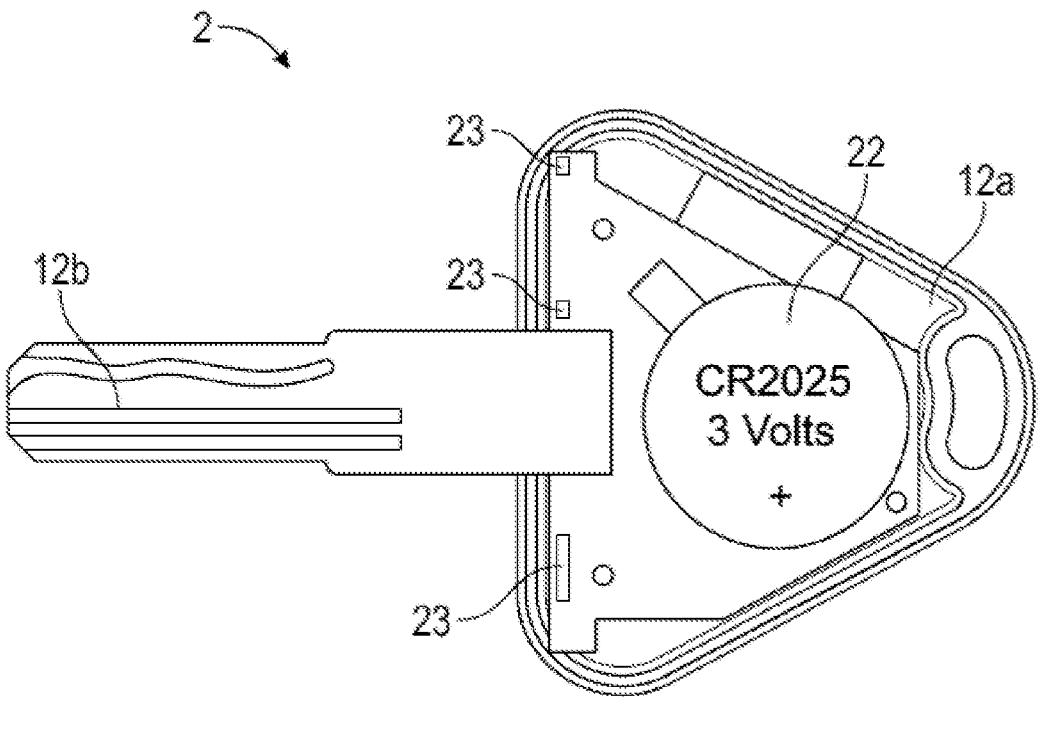
FIG. 18 is a view of a key.
Figure 19:
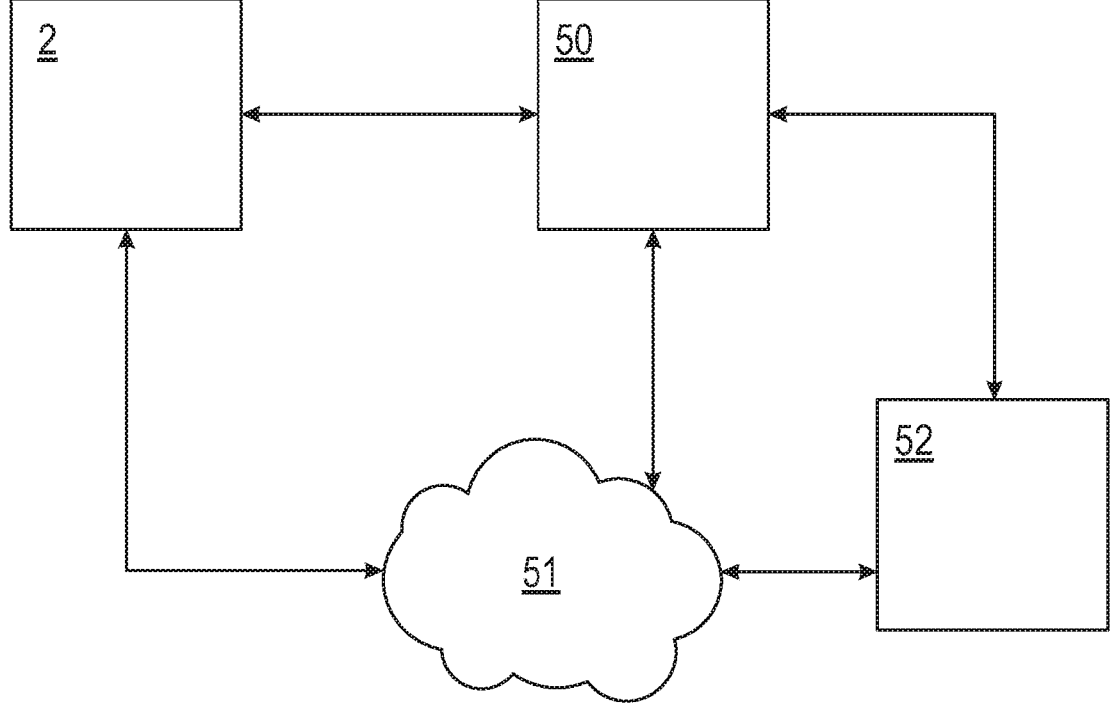
FIG. 19 is a schematic illustration of a network.

In some versions, the or each sensor 23 may include at least three magnetic field sensors 23 (see e.g. FIG. 18). A first and a second of these magnetic field sensors 23 may be located on a first side of the shaft 12*b* and a third of these magnetic field sensors 23 may be located on a second side of the shaft 12*b*. The first magnetic field sensor 23 may be located further from the shaft 12*b* than the second magnetic field sensor 23 (the second magnetic field sensor 23 therefore being located closer to the shaft 12*b*). The second magnetic field sensor 23 may be located generally adjacent the shaft 12*b*. One of the first or third magnetic field sensors 23 may be generally adjacent the magnet 115 when the key 12 is received by the key aperture 113 (i.e. inserted into the cylinder lock 11) and the others of the first, second, or third magnetic field sensors 23 may be further away from the magnet 115. The third magnetic field sensor 23 may be located such that it opposes the first and second magnetic field sensors 23 across a portion of the key housing 121 and/or head 12*a*. As will be appreciated, the rotational axis of the key 12 (when in use) may extend through the shaft 12*b* and, in some versions, the distance from the shaft 12*b* as described herein may be equally described as a distance from the rotational axis of the key 12 when in use.

The first, second and third magnetic field sensors 23 may face towards the cylinder lock 11 (e.g. an active face of each magnetic field sensor 23 may face towards the cylinder lock 11) with the key 12 received thereby. Rotation of the key 12 with respect to the lock system 100 (see herein for other ways to describe this rotational movement) may cause the first and second magnetic field sensors 23 to move away from the magnet 115 and the third magnetic field sensor 23 to move towards the magnet 115 (or vice versa). The sensed magnetic field strengths and/or polarities by the three magnetic field sensors 23 will change during this movement and this information can be used, e.g. by the processor or controller 21, to identify rotation of the key 12 and/or the direction and/or degree of rotation of the key 12, this rotation being with respect to, for example, the lock system 100 (and/or the body 111 and/or the magnet 115).

In some versions, the first and second magnetic field sensors 23 may be located at or towards a first side of the thumbturn 116 and/or thumbturn housing 122 and the third magnetic field sensor 23 may be located at or towards a second side of the thumbturn 116 and/or thumbturn housing 122 (the first and second sides may be with respect to the rotational axis of the thumbturn 116 and may be diametrically opposing sides, for example). The first and second magnetic field sensors 23 may be located such that they oppose the third magnetic field sensor 23 across a portion of the thumbturn 116 and/or thumbturn housing 122. The first, second and third magnetic field sensors 23 may face towards the cylinder lock 11 (e.g. an active face of each magnetic field sensor 23 may face towards the cylinder lock 11). Rotation of the thumbturn 116 with respect to the lock system 100 (see herein for other ways to describe this rotational movement) may cause the first and second magnetic field sensors 23 to move away from the magnet 115 and the third magnetic field sensor 23 to move towards the magnet 115 (or vice versa). The sensed magnetic field strengths and/or polarities by the three magnetic field sensors 23 will change during this movement and this information can be used, e.g. by the processor or controller 21, to identify rotation of the thumbturn 116 and/or the direction and/or degree of rotation of the thumbturn 116, this rotation being with respect to, for example, the lock system 100 (and/or the body 111 and/or the magnet 115).

The first, second and third magnetic field sensors 23 may all be Hall effect sensors 23. Alternatively, the first and second magnetic field sensors 23 may be Hall effect sensors 23 and the third magnetic field sensor 23 may be a Reed switch 23.

In some versions, one of the magnetic field sensors 23 may be a primary magnetic field sensor 23. The remaining magnetic field sensors 23 may, therefore, be secondary magnetic field sensors 23. Each magnetic field sensor 23 may have a particular scan rate (or sampling frequency) associated therewith. The primary magnetic field sensor 23 may have a lower scan rate (or sampling frequency) compared to the secondary magnetic field sensors 23 (which may be e.g. one secondary magnetic field sensor 23 in versions having two magnetic field sensors 23, or two secondary magnetic field sensors 23 in versions having three magnetic field sensors 23, as described above). The primary magnetic field sensor 23 may be the second magnetic field sensor 23 as described above (e.g. the sensor 23 located closest to the shaft 12*b*).

The scan rate of the primary magnetic field sensor 23 (or, equivalently, the sampling frequency) may be in the range of about 2-500 times slower, optionally about 2-200 times slower, optionally about 50-150 times slower, optionally about 100 times slower compared to the scan rate (or sampling frequency) of the secondary magnetic field sensor (s) 23 (or compared to the scan rate or sampling frequency of the secondary magnetic field sensor 23 having the fastest scan rate or sampling frequency—e.g. if there is more than one secondary magnetic field sensor 23 and the secondary magnetic field sensors 23 have different scan rates or sampling frequencies to each other).

The scan rate of the primary magnetic field sensor 23 may be in the range of about one scan every 0.2-500 ms, optionally about every 1-250 ms, optionally about every 1-100 ms, optionally about every 25-75 ms, optionally about every 50 ms (corresponding to a sampling frequency in the range of about 5 kHz—2 Hz, optionally about 1 kHz-4 Hz, optionally about 1 kHz-10 Hz, optionally about 40-13 Hz, optionally about 20 Hz).

The scan rate of the secondary magnetic field sensor(s) 23 may be in the range of about one scan every 0.1-1 ms, optionally about every 0.3-0.7 ms, optionally about every 0.5 ms (corresponding to a sampling frequency in the range of about 10-1 kHz, optionally about 3333-1429 Hz, optionally about 2 kHz).

The smart actuation member circuit 2 (e.g. the processor or controller 21) may be configured to activate (or trigger) the secondary magnetic field sensor(s) 23 in response to a signal received from the primary magnetic field sensor 23. The signal received from the primary magnetic field sensor 23 may be indicative of the detection of a magnetic field by the primary magnetic field sensor 23. A threshold may be applied such that the secondary magnetic field sensor(s) 23 are only activated if the strength of the magnetic field detected by the primary magnetic field sensor 23 exceeds a predetermined threshold. The secondary magnetic field sensor(s) 23 may, therefore, be activated in response to a determination that the key 12 has been inserted into the cylinder lock 11 (e.g. key aperture 113). Accordingly, the secondary magnetic field sensors 23 may be dormant (i.e. not active (e.g. not being sampled and/or not providing an output)) until they are activated by the smart actuation member circuit 2 (e.g. by the processor or controller 21). The secondary magnetic field sensor(s) 23 may, therefore, be activated only when the key 12 is inserted into the cylinder lock 11 (e.g. key aperture 113).

The smart actuation member circuit 2 (e.g. the processor or controller 21) may be configured to deactivate the secondary magnetic field sensor(s) 23 in response to a signal received from the primary magnetic field sensor 23. The signal received from the primary magnetic field sensor 23 may indicate that a magnetic field is not detected by the primary magnetic field sensor 23. A threshold may be applied such that the secondary magnetic field sensor(s) 23 are only deactivated if the strength of a magnetic field detected by the primary magnetic field sensor 23 is below a predetermined threshold. The secondary magnetic field sensor(s) 23 may, therefore, be deactivated in response to a determination that the key 12 has been removed from the cylinder lock 11 (e.g. key aperture 113). Accordingly, the secondary magnetic field sensors 23 may be dormant (i.e. not active (e.g. not being sampled and/or not providing an output)) after being deactivated by the smart actuation member circuit 2 (e.g. by the processor or controller 21). The secondary magnetic field sensor(s) 23 may, therefore, be active only when the key 12 is inserted into the cylinder lock 11 (e.g. key aperture 113).

Use of the primary magnetic field sensor 23 to activate the secondary magnetic field sensor(s) 23 may, therefore, reduce the power consumption of the smart actuation member circuit 2 compared to a circuit which does not use such an activation mechanism, as the secondary magnetic field sensors 23 (with their higher scan rates or sampling frequencies and associated power consumption) are only active (and drawing power) when the key 12 is inserted into the cylinder lock 11 (e.g. key aperture 113)—in versions in which the smart actuation member circuit 2 is incorporated into the key 12. As mentioned previously, the magnetic field sensors 23 may all be Hall effect sensors 23.

In some versions, the or each sensor 23 includes one or more acceleration sensors 23 which may be used to sense rotational movement of the key 12 and/or the direction of that rotational movement about the rotational axis of the key 12, and/or linear movement of the key 12 along the rotational axis of the key 12 (e.g. movement into or out of the cylinder lock 11) and/or the direction of such linear movement. In some versions, the or each sensor 23 includes one or more acceleration sensors 23 which may be used to sense rotational movement of the thumbturn 116 and/or the direction of that rotational movement about the rotational axis of the thumbturn 116. This information (relating to the key 12 and/or thumbturn 16) may be provided to the processor or controller 21 which may use this information in addition to or instead of information received from a magnetic field sensor 23. Therefore, it may be possible for some versions to use fewer magnetic field sensors 23 and/or simpler sensors 23 which cannot, for example, sense the polarity of the magnetic field but merely its presence.

In some versions, the or each sensor 23 may include at least one magnetic field sensor 23 and an acceleration sensor 23. Such versions may provide a (e.g. double) validation of the direction of rotation of the actuation member (e.g. key 12 or thumbturn 116), e.g. by comparing data from the acceleration sensor 23 and the or each magnetic field sensor 23. Such versions may, therefore, provide a more reliable and/or accurate determination of the direction of rotation of the actuation member (e.g. key 12 or thumbturn 116). In such versions, the processor or controller 21 may be configured to implement logic to determine an action of the actuation member and/or a status of the cylinder lock 11 using data obtained from the acceleration sensor 23 and the or each magnetic field sensor 23. Additionally or alternatively, the smart actuation member circuit 2 may be configured to transmit data obtained from the acceleration sensor 23 and the or each magnetic field sensor 23 to a user device 50 and/or remote device 52 (see below), which may implement the logic to determine an action of the actuation member and/or a status of the cylinder lock 11.

In particular, some versions may include at least two magnetic field sensors 23 (which may be arranged as described herein) and an acceleration sensor, or at least three magnetic field sensors 23 (e.g. a primary magnetic field sensor 23 and two secondary magnetic field sensors 23) and an acceleration sensor. Such versions may provide particularly accurate and/or reliable determination of the direction of rotation of the actuation member (e.g. key 12 or thumbturn 116). In such versions, the processor or controller 21 may be configured to implement logic to determine an action of the actuation member and/or determine a status of the cylinder lock 11 using data obtained from the acceleration sensor 23 and the or each magnetic field sensor 23. Additionally or alternatively, the smart actuation member circuit 2 may be configured to transmit data obtained from the acceleration sensor 23 and the or each magnetic field sensor 23 to a user device 50 and/or remote device 52 (see below), which may implement the logic to determine an action of the actuation member and/or a status of the cylinder lock 11.

A setup process may be provided in which a user specifies the handing of a leaf 30 to which the cylinder lock 11 is fitted. The leaf 30 may be a door or window, for example. FIGS. 14a and 14b illustrate left-handed and right-handed doors 30. In particular, a first side of a leaf 30 may be attached to a frame 31 via hinges 32. When viewed by the user, a leaf 30 having the hinges 32 on the user's left, as illustrated in FIG. 14a, may be considered left-handed. Likewise, a leaf 30 having the hinges 32 on the user's right, as illustrated in FIG. 14b, may be considered right-handed. The leaf 30 may further include the cylinder lock 11 located generally adjacent a second side of the leaf 30 which is opposite the first side and/or hinges 32.

In the logic table illustrated in FIG. 12, the handing of the leaf 30 is considered when viewed from an internal side of the leaf 30. However, as will be appreciated, the handing could also be determined when viewed from an external side of the leaf 30.

The setup process may include pairing the smart actuation member circuit 2 with the user device 50 (e.g. a computing device such as a laptop, mobile phone or cell phone, tablet computer, or other type of computer). This may be via a wireless communications link (e.g. using the transmitter 24 and/or receiver 25). The smart actuation member circuit 2 may be paired with a user device via a Bluetooth connection, for example.

The user device 50 may present a configuration screen to the user, which allows the user to select the handing of the leaf 30 including the cylinder lock 11 for which the actuation member (e.g. key 12 or thumbturn 116) is configured. The handing of the leaf 30 may then be communicated to the smart actuation member circuit 2 in some versions, may be stored on the user device 50, or may be communicated to a remote device 52 (e.g. a server).

The smart actuation member circuit 2 may, therefore, communicate with the user device 50 and/or remote device 52 via a network (e.g. wireless network) 51. The user device 50 may communicate directly with the remote device 52 or may communicate with the remote device 52 via the network 51. The user device 50 and/or remote device 52 may, therefore, be examples of remote locations or hubs as referred to herein.

In some versions, the cylinder lock 11 may be marked to indicate its handing on installation—such that an installer (e.g. user) may install the cylinder lock 11 as indicated. Thus, the handing may be predetermined (e.g. based on one or more markings provided on the cylinder lock 11 or as a part thereof).

With the handing of the leaf 30 determined, logic can be implemented by the processor 21, hub and/or remote location (e.g. user device 50 and/or remote device 52) to determine an action of the actuation member and/or a status of the cylinder lock 11. Data obtained from the sensors 23 may, therefore, be transmitted to the hub and/or remote location (e.g. user device 50 and/or remote device 52), and such data may be used to determine an action of the actuation member and/or a status of the cylinder lock 11.

A schematic example of the logic which may be implemented (e.g. by the processor or controller 21 or by the user device 50 or remote device 52) to determine an action of the actuation member and/or status of the cylinder lock 11 is shown in FIG. 12 for the cylinder lock 11 and smart actuation member circuit 2 illustrated in FIGS. 13a-13d. The cylinder lock 11 used in this example includes a magnet 115 at each exposed end thereof, with the poles aligned such that like poles face each other across the length of the cylinder lock 11. In the examples shown, the North pole of the magnet 115 located towards the internal side of the cylinder lock 11 appears on the user's left when viewed from the internal side of the cylinder lock 11, and the North pole of the magnet 115 located towards the external side of the cylinder lock 11 appears on the user's right when viewed from the external side of the cylinder lock 11 (see FIGS. 13a and 13b).

The smart actuation member circuit 2 in this example includes a first Hall effect sensor 23 located towards a first side of the actuation member and a second Hall effect sensor 23 located towards a second side of the actuation member opposite the first side, with the two Hall effect sensors 23 being located either side of the axis of rotation of the actuation member in use (e.g. key 12 or thumbturn 116). These two Hall effect sensors may be secondary magnetic field sensors 23 as described herein, and may in some versions be activated by a primary magnetic field sensor 23 (not shown). For simplicity, the described example will focus on the two secondary Hall effect sensors 23. The smart actuation member circuit 2 in this example further includes an acceleration sensor 23 (not shown).

In the described example, the cylinder lock 11 is configured to be installed with the magnets 115 located in a horizontal orientation, below the plug 112 of the cylinder lock 11. It is assumed that the smart actuation member circuit 2 is initially in a horizontal position. In this example, the two Hall effect sensors 23 are located on the same surface of a printed circuit board (PCB) of the smart actuation member circuit 2, thereby leading to two possible orientations of the Hall effect sensors 23 when the smart actuation member circuit 2 is held horizontally—either "up", when the Hall effect sensors 23 are on the top side of the PCB, or "down", when the Hall effect sensors 23 are on the bottom side of the PCB. In this example, with the Hall effect sensors 23 in the "up" orientation, the first Hall effect sensor 23 (labelled "1" in FIGS. 13c and 13d and referred to as "HS1") is located on the right from the perspective of the user (i.e. looking at the exposed end of the cylinder lock 11 at which the actuation member is used) when the actuation member is in its use position (e.g. inserted into the cylinder lock 11). The second Hall effect sensor (labelled "2" in FIGS. 13c and 13d and referred to as "HS2") is therefore located on the user's left when in the same orientation.

The Hall effect sensors 23 are configured to determine a polarity ("N" for North and "S" for South) of a detected magnetic field in this example. The acceleration sensor (not shown) is configured to determine a direction of rotation of the actuation member in this example—in particular, clockwise (CW) or anti-clockwise, i.e. counter-clockwise (anti-CW), from the perspective of the user (i.e. looking at the exposed end of the cylinder lock 11 at which the actuation member is used).

For a right-handed leaf 30, therefore, with the described arrangement of magnets 115 and sensors 23, two datasets corresponding to the action of locking the leaf 30 and/or cylinder lock 11 and/or lock system 100 from the internal side of the leaf 30 may be obtained. With the Hall effect sensors 23 initially facing up, the acceleration sensor would detect clockwise rotation, and the sequence of polarities detected by the Hall effect sensors 23 would be: (i) HS1-S (ii) HS1-N (iii) HS2-S (iv) HS2-N. With the Hall effect sensors 23 initially facing down, the acceleration sensor would detect clockwise rotation, and the sequence of polarities detected by the Hall effect sensors 23 would be: (i) HS2-S (ii) HS2-N (iii) HS1-S (iv) HS1-N. Accordingly, the relevant processing device (be it the processor 21, user device 50, or remote device 52) can determine that a locking action has occurred if either of these datasets are received from the sensors 23.

For a right-handed leaf 30 with the described arrangement of magnets 115 and sensors 23, two datasets corresponding to the action of unlocking the leaf 30 and/or cylinder lock 11 and/or lock system 100 from the internal side of the leaf 30 may be obtained. With the Hall effect sensors 23 initially facing up, the acceleration sensor would detect anti-clock-wise rotation, and the sequence of polarities detected by the Hall effect sensors 23 would be: (i) HS2-N (ii) HS2-S (iii) HS1-N (iv) HS1-S. With the Hall effect sensors 23 initially facing down, the acceleration sensor would detect anti-clockwise rotation, and the sequence of polarities detected by the Hall effect sensors 23 would be: (i) HS1-N (ii) HS1-S (iii) HS2-N (iv) HS2-S. Accordingly, the relevant processing device (be it the processor 21, user device 50, or remote device 52) can determine that an unlocking action has occurred if either of these datasets are received from the sensors 23.

For a right-handed leaf 30 with the described arrangement of magnets 115 and sensors 23, two datasets corresponding to the action of locking the leaf 30 and/or cylinder lock 11 and/or lock system 100 from the external side of the leaf 30 may be obtained. With the Hall effect sensors 23 initially facing up, the acceleration sensor would detect anti-clock-wise rotation, and the sequence of polarities detected by the Hall effect sensors 23 would be: (i) HS2-S (ii) HS2-N (iii) HS1-S (iv) HS1-N. With the Hall effect sensors 23 initially facing down, the acceleration sensor would detect anti-clockwise rotation, and the sequence of polarities detected by the Hall effect sensors 23 would be: (i) HS1-S (ii) HS1-N (iii) HS2-S (iv) HS2-N. Accordingly, the relevant processing device (be it the processor 21, user device 50, or remote device 52) can determine that a locking action has occurred if either of these datasets are received from the sensors 23.

For a right-handed leaf 30 with the described arrangement of magnets 115 and sensors 23, two datasets corresponding to the action of unlocking the leaf 30 and/or cylinder lock 11 and/or lock system 100 from the external side of the leaf 30 may be obtained. With the Hall effect sensors 23 initially facing up, the acceleration sensor would detect clockwise rotation, and the sequence of polarities detected by the Hall effect sensors 23 would be: (i) HS1-N (ii) HS1-S (iii) HS2-N (iv) HS2-S. With the Hall effect sensors 23 initially facing down, the acceleration sensor would detect clockwise rota-tion, and the sequence of polarities detected by the Hall effect sensors 23 would be: (i) HS2-N (ii) HS2-S (iii) HS1-N (iv) HS1-S. Accordingly, the relevant processing device (be it the processor 21, user device 50, or remote device 52) can determine that an unlocking action has occurred if either of these datasets are received from the sensors 23.

For a left-handed leaf 30 with the described arrangement of magnets 115 and sensors 23, two datasets corresponding to the action of locking the leaf 30 and/or cylinder lock 11 and/or lock system 100 from the internal side of the leaf 30 may be obtained. With the Hall effect sensors 23 initially facing up, the acceleration sensor would detect anti-clock-wise rotation, and the sequence of polarities detected by the Hall effect sensors 23 would be: (i) HS2-N (ii) HS2-S (iii) HS1-N (iv) HS1-S. With the Hall effect sensors 23 initially facing down, the acceleration sensor would detect anti-clockwise rotation, and the sequence of polarities detected by the Hall effect sensors 23 would be: (i) HS1-N (ii) HS1-S (iii) HS2-N (iv) HS2-S. Accordingly, the relevant processing device (be it the processor 21, user device 50, or remote device 52) can determine that a locking action has occurred if either of these datasets are received from the sensors 23.

For a left-handed leaf 30 with the described arrangement of magnets 115 and sensors 23, two datasets corresponding to the action of unlocking the leaf 30 and/or cylinder lock 11 and/or lock system 100 from the internal side of the leaf 30 may be obtained. With the Hall effect sensors 23 initially facing up, the acceleration sensor would detect clockwise rotation, and the sequence of polarities detected by the Hall effect sensors 23 would be: (i) HS1-S (ii) HS1-N (iii) HS2-S (iv) HS2-N. With the Hall effect sensors 23 initially facing down, the acceleration sensor would detect clockwise rota-tion, and the sequence of polarities detected by the Hall effect sensors 23 would be: (i) HS2-S (ii) HS2-N (iii) HS1-S (iv) HS1-N. Accordingly, the relevant processing device (be it the processor 21, user device 50, or remote device 52) can determine that an unlocking action has occurred if either of these datasets are received from the sensors 23.

For a left-handed leaf 30 with the described arrangement of magnets 115 and sensors 23, two datasets corresponding to the action of locking the leaf 30 and/or cylinder lock 11 and/or lock system 100 from the external side of the leaf 30 may be obtained. With the Hall effect sensors 23 initially facing up, the acceleration sensor would detect clockwise rotation, and the sequence of polarities detected by the Hall effect sensors 23 would be: (i) HS1-N (ii) HS1-S (iii) HS2-N (iv) HS2-S. With the Hall effect sensors 23 initially facing down, the acceleration sensor would detect clockwise rota-tion, and the sequence of polarities detected by the Hall effect sensors 23 would be: (i) HS2-N (ii) HS2-S (iii) HS1-N (iv) HS1-S. Accordingly, the relevant processing device (be it the processor 21, user device 50, or remote device 52) can determine that a locking action has occurred if either of these datasets are received from the sensors 23.

For a left-handed leaf 30 with the described arrangement of magnets 115 and sensors 23, two datasets corresponding to the action of unlocking the leaf 30 and/or cylinder lock 11 and/or lock system 100 from the external side of the leaf 30 may be obtained. With the Hall effect sensors 23 initially facing up, the acceleration sensor would detect anti-clock-wise rotation, and the sequence of polarities detected by the Hall effect sensors 23 would be: (i) HS2-S (ii) HS2-N (iii) HS1-S (iv) HS1-N. With the Hall effect sensors 23 initially facing down, the acceleration sensor would detect anti-clockwise rotation, and the sequence of polarities detected by the Hall effect sensors 23 would be: (i) HS1-S (ii) HS1-N (iii) HS2-S (iv) HS2-N. Accordingly, the relevant processing device (be it the processor 21, user device 50, or remote device 52) can determine that an unlocking action has occurred if either of these datasets are received from the sensors 23.

It can be seen that the data produced by the sensors 23 in this example (and some other examples) forms unique datasets (e.g. eight in this example). Provided the handing of the leaf 30 is known, therefore, these datasets can be used to determine what action (lock or unlock) has occurred.

As mentioned above, the or each sensor 23 may include one or more sensors configured to sense the proximity of a user's hand to the smart actuation member circuit 2. As a user will typically have to have their hand in close proximity to (i.e. holding and manipulating) the key 12 to insert, turn, and/or remove the key 12 with respect to the cylinder lock 11, the sensing of the proximity of the user's hand may be used to help the processor or controller 21 to distinguish between—for example—sensed magnetic fields and/or movements which are not as a result of the key 12 being used with the cylinder lock 11 but which may be experienced, for example, when the key 12 is carried in a bag or the like. Similarly, as a user will typically have to have their hand in close proximity to (i.e. holding and manipulating) the thumbturn 116 to turn it with respect to the cylinder lock 11, the sensing of the proximity of the user's hand may be used to help the processor or controller 21 to distinguish between—for example—sensed magnetic fields and/or movements which are not as a result of the thumbturn 116 being turned with respect to the cylinder lock 11 but which may be experienced, for example, due to nearby magnetic and/or electronic devices (which may be transported through a door to which the cylinder lock 11 is fitted, for example).

In some versions which include the receiver 25, the receiver 25 may be configured to receive a signal from the hub or other remote location. The range of the transmission of this signal may be relatively limited (e.g. limited to less than about 100 m or less than about 50 m or less than about 30 m). Therefore, the processor or controller 21 may be configured to confirm whether such a signal has been received recently (or to check a signal strength of the received signal) in order to confirm that information received from the one or more sensors 23 may be information indicative of use of the key 12 with the cylinder lock 11 (i.e. that the key 12 is likely in the proximity of the cylinder lock 11).

Whilst some versions may use other types of sensor 23, the use of magnetic field sensor(s) 23 such as Hall Effect sensors may be preferable in some situations (compared to some of the other sensors 23 mentioned herein) due to their relatively low power consumption.

The magnet 115 may be a neodymium magnet and may be an N42 grade magnet 115. The magnet may have a width (e.g. diameter) of about 4 mm and a length of about 8 mm. The key housing 121 may have a length of about 4 cm, and/or a width of about 4 cm, and/or a depth of about 1 cm, in some versions. The thumbturn housing 122 may have a length of about 4 cm, and/or a width of about 4 cm, and/or a depth of about 1 cm, in some versions.

As will be appreciated, the use of a single (i.e. one and only one) magnet 115 may be an option and may be well suited to particular types of cylinder lock 11. However, other types of cylinder lock 11 may enable the use of multiple magnets 115 at different locations. Indeed, in order to detect, for example, certain degrees of rotation of the key 12 and/or thumbturn 116 (e.g. with respect to the lock system 100) more than one magnet 115 may be needed and/or the provided magnet(s) 115 may need to be in a location other than that depicted (e.g. in FIGS. 1 and 11). If there are multiple magnets 115 provided then they need not all have the same magnetic field strength (so that the or each sensor 23 may be used to determine, by measuring the field strength, which of the magnets 115 is adjacent a particular sensor 23, for example) and/or need not have the same polar orientation as each other.

Cylinder locks 11 that include the thumbturn 116 may include a single magnet 115 located at or towards the end of the cylinder lock 11 at which the thumbturn 116 is located. Alternatively, cylinder locks 11 including the thumbturn 116 may include a plurality of magnets 115 that may all be located at or towards the end of the cylinder lock 11 at which the thumbturn 116 is located. This may provide a simpler cylinder lock 11 construction and may mean that "standard" (i.e. not including the smart actuation member circuit 2) keys can be used with the cylinder lock 11, while still enabling the status (e.g. locked/unlocked) of the cylinder lock 11 to be determined. Operation of the cylinder lock 11 using the standard key 44 (or the key 12) may cause the thumbturn 116 to rotate in tandem (e.g. together or in synchrony) with the standard key 44, key 12, and/or plug 112. Accordingly, in such versions, rotation of the thumbturn 116 will allow the status of the cylinder lock 11 to be determined as described previously (e.g. via the movement of the sensors 23 through the magnetic field of the magnet or magnets 115), even if a standard key 44 is used to operate the cylinder lock 11. Of course, additional magnets may be provided elsewhere within the cylinder lock 11, but such additional magnets are not required to enable the status of the cylinder lock 11 to be determined.

Figure 20:
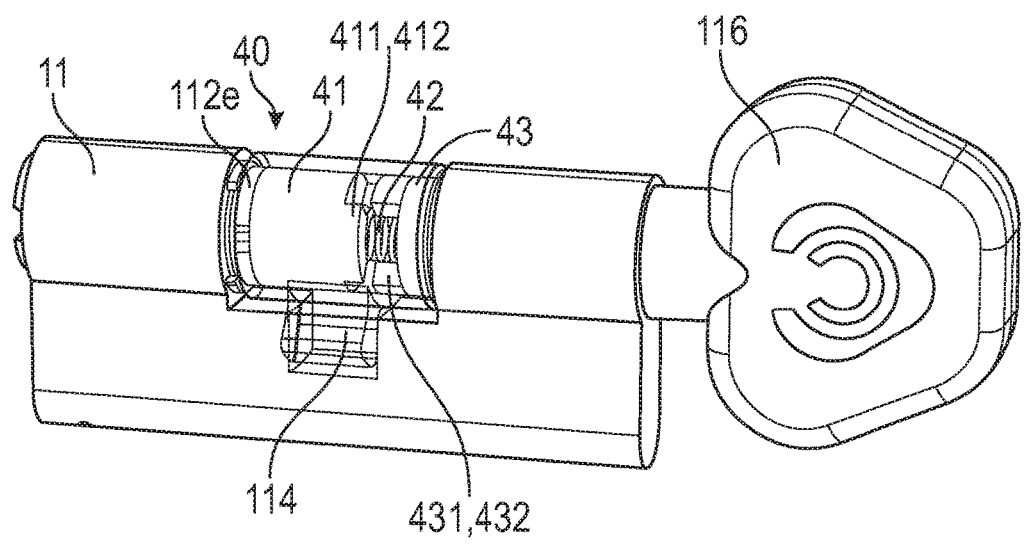
FIGS. 20 and 21 show cylinder locks.
Figure 21:
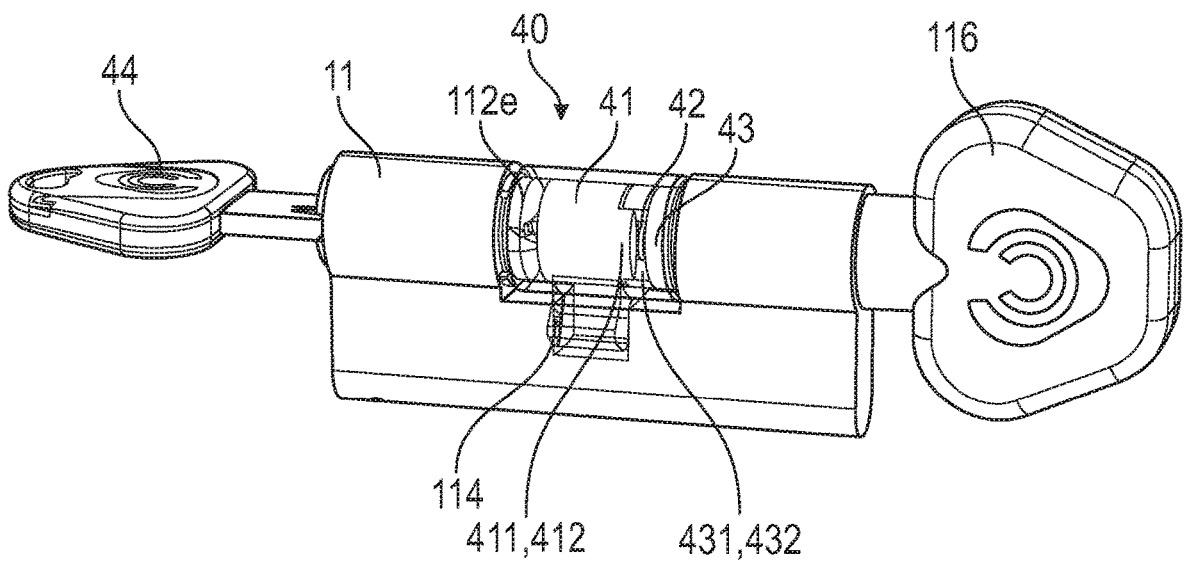

The cylinder lock 11 may, therefore, include a clutch mechanism 40 (see e.g. FIGS. 20 and 21). The clutch mechanism 40 may be located adjacent the member 114 (e.g. cam). In some versions, the member 114, or a part thereof, may at least partly envelop a portion of the clutch mechanism 40. The clutch mechanism 40 may, therefore, be at least partially located within the member 114 (for example, in versions where the member 114 includes a generally hollow cylindrical portion, with the clutch mechanism 40 at least partially located in the hollow portion, as is generally illustrated in FIGS. 20 and 21).

As will be appreciated, the cylinder lock 11 may include two plugs 112, with a plug 112 provided at either end of the cylinder lock 11. The plugs 112 may, therefore, be referred to as an external plug 112e and an internal plug. The thumbturn 116, in normal use, may be located on the internal side of the cylinder lock 11, and may therefore actuate the internal plug.

The clutch mechanism 40 may be configured to enable rotation of the thumbturn 116 in tandem (e.g. together or in synchrony) with the standard key 44, key 12, and/or external plug 112e. The clutch mechanism 40 may include an external clutch member 41, resilient member 42, and/or internal clutch member 43. The resilient member 42 may include a spring, such as a helical spring. The terms "external" and "internal" are labels that refer to the intended use of the cylinder lock 11, in which the external clutch member 41 will be located towards an external side of a leaf 30 (e.g. door) and the internal clutch member 43 will be located towards an internal side of a leaf 30 (e.g. door). The terms "external" and "internal" may, therefore, be replaced with "first" and "second" respectively; however, for ease of understanding, the terms "external" and "internal" will be used herein.

The external clutch member 41 may be configured to engage the external plug 112e. As described, internal and external plugs 112 may be provided. The internal and external plugs 112 may be spaced apart (e.g. along a longitudinal axis of the cylinder lock 11). The internal and external plugs 112 may be configured to rotate independently of each other in a first configuration and to rotate in tandem (e.g. together or in synchrony) in a second configuration. The external plug 112e may be configured to receive, at least partially, the actuation member such as the key 44 and/or smart key 12. The internal plug 112 may be configured to receive the actuation member such as the thumbturn 116 (which may be removable as described herein). The internal plug 112 may also, therefore, be configured to receive, at least partially, the key 44 and/or smart key 12. However, in some versions, the external plug 112e may be configured not to receive the thumbturn 116, or at least not to be operable or actuatable by the thumbturn 116 as described herein.

The external plug 112e may include the key aperture 113, which may be configured for location on an external side of a leaf 30, for example. As described, the external plug 112e may be configured to rotate with rotation of a corresponding key, which may be a standard key 44 and/or smart key 12. The external clutch member 41 may, therefore, be configured to rotate with the external plug 112e and/or the key 44 and/or smart key 12. The external clutch member 41 may, therefore, be located adjacent and/or may engage the external plug 112e, and may be located in-line with the external plug 112e in some versions. A first end of the external clutch member 41 may abut and/or engage a part of the external plug 112e.

The external clutch member 41 may have a generally cylindrical form, which may or may not be hollow or include a hollow portion, and may include an engagement portion 411 which may include a protrusion 412. The protrusion 412 may extend from or around a portion of a perimeter of the external clutch member 41. The protrusion 412 may extend away from the external plug 112e, and may extend towards the resilient member 42, internal clutch member 43, and/or thumbturn 116. The protrusion 412 may, for example, extend around about a quarter of the perimeter of the external clutch member 41. In some versions, a plurality of protrusions 412 may be provided on the external clutch member 41 and this plurality of protrusions 412 may be considered the engagement portion 411 of the external clutch member 41.

The internal clutch member 43 may be configured to engage the internal plug 112. As described, the internal plug 112 may be configured to rotate with rotation of a corresponding actuation member, such as the thumbturn 116 and/or a key, which may be a standard key 44 and/or smart key 12. The internal clutch member 43 may, therefore, be configured to rotate with the internal plug 112 and/or the actuation member and/or the thumbturn 116 and/or the key 44 and/or smart key 12. The internal clutch member 43 may, therefore, be located adjacent and/or may engage the internal plug 112, and may be located in-line with the internal plug 112 in some versions. A first end of the internal clutch member 43 may abut and/or engage a part of the internal plug 112. The internal clutch member 43 may be fixed to the member 114 (e.g. cam) such that rotation of the member 114 causes corresponding rotation of the internal clutch member 43 (and vice versa). The internal clutch member 43 may, therefore, rotate in tandem (e.g. together or in synchrony) with the member 114.

The internal clutch member 43 may have a generally cylindrical form, which may or may not be hollow or include a hollow portion, and may include an engagement portion 431 which may include a recess 432. The recess 432 may extend into or around a portion of a perimeter of the internal clutch member 41. The recess 432 may extend away from the external plug 112e, and may extend away from the resilient member 42 and/or external clutch member 41. The recess 432 may extend towards the internal plug 112 and/or thumbturn 116. The recess 432 may, for example, extend around about a quarter of the perimeter of the internal clutch member 43. In some versions, a plurality of recesses 432 may be provided on the internal clutch member 43 and this plurality of recesses 432 may be considered the engagement portion 431 of the internal clutch member 43.

The engagement portion 411 of the external clutch member 41 may be configured to engage the engagement portion 431 of the internal clutch member 43. The engagement portion 411 of the external clutch member 41 may, therefore, be configured to abut the engagement portion 431 of the internal clutch member 43. The recess 432 may, therefore, be configured to receive a part of the protrusion 412.

In some versions the positions of the protrusion 412 and the recess 432 may be reversed such that the engagement portion 411 of the external clutch member 41 includes the recess and the engagement portion 431 of the internal clutch member 43 includes the protrusion. Accordingly, one of the external clutch member 41 engagement portion 411 and the internal clutch member 43 engagement portion 431 may include a protrusion, and one of the external clutch member 41 engagement portion 411 and the internal clutch member

43 engagement portion 431 may include a recess. The protrusion and recess may correspond and/or may be configured to mate. Likewise, the external clutch member 41 engagement portion 411 and the internal clutch member 43 engagement portion 431 may be configured to mate.

A second end of the external clutch member 41 (opposite the first end) may, therefore, be configured to abut and/or engage a second end of the internal clutch member 43 (opposite the first end of the internal clutch member 43).

The resilient member 42 may be located adjacent the external clutch member 41 and/or internal clutch member 43. The resilient member 42 may be located between the external clutch member 41 and internal clutch member 43. The resilient member 42 may abut the second end of the external clutch member 41 and/or the second end of the internal clutch member 43.

The clutch mechanism 40 may, therefore, include an engaged configuration and a disengaged configuration. The resilient member 42 may bias the clutch mechanism 40 towards the disengaged configuration. In the engaged configuration, the external clutch member 41 may engage the internal clutch member 43 (and vice versa), for example by engagement of the engagement portion 411 of the external clutch member 41 with the engagement portion 431 of the internal clutch member 431. In the disengaged configuration, the external clutch member 41 may not engage the internal clutch member 43.

In the engaged configuration, therefore, the external clutch member 41 and internal clutch member 43 may rotate in tandem (e.g. together or in synchrony). In the disengaged configuration, the external clutch member 41 and internal clutch member 43 may rotate independently of each other (e.g. the external clutch member 41 may rotate with respect to the internal clutch member 43, whereas in the engaged configuration, relative rotation of the external clutch member 41 with respect to the internal clutch member 43 may be inhibited).

The resilient member 42 may bias the clutch mechanism 40 towards the disengaged configuration. The resilient member 42 may, therefore, exert a force on the external and/or internal clutch members 41,43 to push the external and internal clutch members 41,43 away from each other. The biasing action of the resilient member 42 may be overcome by insertion of an actuation member (e.g. key 44 and/or smart key 12) into the key aperture 113 of the external plug 112e such that the actuation member pushes the external clutch member 41 into the engaged configuration. The insertion of an actuation member into the key aperture 113 of the external plug 112e may, therefore, move the clutch mechanism 40 into the engaged configuration by exerting a force on the external clutch member 41 (e.g. a pushing force).

The external clutch member 41 may, therefore, move (e.g slide) along the longitudinal axis of the cylinder lock 11. The external clutch member 41 may move (e.g. slide) towards and away from the internal clutch member 43, and may move (e.g. slide) into and out of engagement with the internal clutch member 43.

In the engaged configuration, therefore, the thumbturn 116 located at the internal end of the cylinder lock 11 may rotate in tandem (e.g. together or in synchrony) with the actuation member (e.g. key 44 and/or smart key 12) inserted into the external end of the cylinder lock 11. Accordingly, the smart actuation member circuit 2 of the thumbturn 116 may be used to determine the status of the cylinder lock 11 and/or lock apparatus 1 even if a standard key 44 is used to actuate the cylinder lock 11. In the disengaged configuration, the thumbturn 116 may be used to actuate the cylinder lock 11 without causing rotation of the external plug 112e.

In accordance with the versions described herein, there may be provided a key 12 having the smart actuation member circuit 2 (which may in that case be the smart key circuit 2), there may be the thumbturn 116 having the smart actuation member circuit 2 (which may in that case be the smart thumbturn circuit 2), there may be the cylinder lock 11 including the magnet bore 115a, there may be the cylinder lock 11 including the magnet 115, there may be the lock apparatus 1 which includes the cylinder lock 11 and the key 12 and/or the thumbturn 116, there may be the lock system 100 including the cylinder lock 11 fitted thereto, there may be the lock system 100 including the lock apparatus 1 fitted thereto, there may be the smart actuation member circuit 2 (e.g. smart key circuit 2) configured to be fitted to the key 12, there may be the smart actuation member circuit 2 (e.g. smart thumbturn circuit 2) configured to be fitted to the thumbturn 116, there may be a method of retrofitting the cylinder lock 11 to a lock system 100, there may be a method of fitting the magnet 115 to the cylinder lock 11, there may be a method of operating the cylinder lock 11 with the key 12 and sensing one or more actions of the key 12 with respect to the cylinder lock 11, there may be a method of operating the cylinder lock 11 with the thumbturn 116 and sensing one or more actions of the thumbturn 116 with respect to the cylinder lock 11, and so on.

The hub or remote location may be a computing device which may be configured to receive signals and information from the smart actuation member circuit 2 and which may then forward the information to another computing device (such as a server). The hub or remote location computing device may be configured to transmit instructions to the smart actuation member circuit 2, for example. Data obtained from the sensors 23 may, therefore, be transmitted to the hub and/or remote location (e.g. user device 50 and/or remote device 52), and such data may be used to determine an action of the actuation member and/or a status of the cylinder lock 11.

In some versions, the lock apparatus 1 may include a plurality of keys 12, each of which may have the smart actuation member circuit 2. An identifier may be associated with each smart actuation member circuit 2 such that the key 12 used to operate the cylinder lock 11 can be identified. The identifier may be transmitted from the smart actuation member circuit 2 to the hub or remote location, and may in some versions be transmitted to the hub or remote location with the sensor outputs and/or determined key 12 action. Each identifier may be associated with a user, such that the person who operated the cylinder lock 11 can be identified.

The location sensor 26 may be configured to determine a location of the smart actuation member circuit 2. The smart actuation member circuit 2 may be configured to transmit the determined location to the hub or remote location (e.g. to the user device 50). The smart actuation member circuit 2 may be configured to transmit the determined location periodically, and/or in response to instructions received from the hub or remote location (e.g. user device 50). The location sensor 26 may determine the location using a radionavigation system such as a satellite radio navigation system (e.g. GPS and/or Galileo), and/or GPRS signals, for example. The determined location may, therefore, be used to find a lost key 12, for example.

In some versions the location of the smart actuation member circuit 2 may be determined without using the location sensor 26. For example, a signal from the transmitter 24 may be used to determine the location of the smart actuation member circuit 2. In particular, a strength of the signal from the transmitter 24 received by the remote location (e.g. user device 50) may be used to determine the location of the smart actuation member circuit 2. In this way, the location of the smart actuation member circuit 2 (and thereby the lost key 12, for example) may be determined without the use of a dedicated location sensor 26. For example, the smart actuation member circuit 2 may be paired to the user device 50 via Bluetooth, and the strength of the Bluetooth signal may be used to determine the location of the smart actuation member circuit 2.

The smart actuation member circuit 2 may be configured to issue an alert in response to instructions received from the hub or remote location (e.g. user device 50). The alert may be an audio and/or visual and/or haptic alert, for example. The smart actuation member circuit 2 may, therefore, be configured to produce a noise, light, and/or vibration in response to instructions received from the hub or remote location (e.g. user device 50). This may assist the user in finding the smart actuation member circuit 2 (and e.g. the key 12).

The smart actuation member circuit 2 may be associated with a computer program operating on a user computing device which is configured to receive information about the state of the cylinder lock 11 and/or information about the actions of the key 12 with respect to the cylinder lock 11 and/or information about the actions of the thumbturn 116 with respect to the cylinder lock 11. This information may be received from the hub or remote location (e.g. from the computing device at the hub or remote location) and this may be via the server, for example. The computer program may display this information to the user or may display information derived from this information to the user. The user may be alerted through the computer program about changes in the state of the cylinder lock 11 and/or actions of the key 12 with respect to the cylinder lock 11 and/or actions of the thumbturn 116 with respect to the cylinder lock 11. This alert may be visual and/or audible.

It will be appreciated that versions of the cylinder lock 11 can be used in lock systems 100 designed for use with standard cylinder locks (such as a Euro cylinder lock) and which may, indeed, have used another standard cylinder lock for some time (e.g. a number of years). Thus, it is possible to retro fit versions of the disclosed technology. This may be enabled, at least in part, by the provision of the smart actuation member circuit 2 in the key 12 and/or thumbturn 116 and/or thumbturn housing 122 (which may be removable from the thumbturn 116) rather than in the cylinder lock 11 (which may, for example, mean that a standard size cylinder lock 11 can be used with the present technology, instead of requiring a larger cylinder lock to house relevant circuitry). If the cylinder lock 11 is of a standard form (such as a Euro cylinder lock) there may, therefore, be a large number of potentially compatible lock systems 100 already present in the marketplace. Versions may allow these potentially compatible lock systems 100 to be upgraded to "smart" technology very simply (e.g. by replacement of the cylinder lock 11).

The thumbturn 116 may be retrofitted to the cylinder lock 11. This may include the removal of a prior thumbturn and installation of the thumbturn 116 in place of the prior thumbturn. For example, the prior thumbturn may be attached to the cylinder lock 11 using a removable (or otherwise selectively engageable) fixing member such as a grub screw, which may be removed to remove the prior thumbturn. The thumbturn 116 may be attached to the cylinder lock 11 using the removable fixing member e.g.

grub screw. The thumbturn 116 may, therefore, be removable from the cylinder lock 11.

In some versions, the thumbturn 116 may be retrofitted to a cylinder lock 11 which did not previously include a thumbturn. The thumbturn 116 may, therefore, include a shaft configured to operate the cylinder lock 11, in some versions. The shaft may be of a similar form to the shaft 12*b* of the key 12 which is keyed for the cylinder lock 11. To retrofit the thumbturn 116 to a cylinder lock 11 which did not previously include a thumbturn, therefore, the shaft of the thumbturn 116 may be inserted into the key aperture 113.

In some versions the cylinder lock 11 may include different keying (e.g. pinning) at each end. The cylinder lock 11 may, as described, include a first (external) end configured to be installed facing an external side of a leaf 30 and a second (internal) end configured to be installed facing an internal side of a leaf 30. Internal and external refer to the sides of the leaf 30 in use, as described previously. The external end of the cylinder lock 11 may include a more secure keying than the internal end of the cylinder lock 11. The external plug 112*e* may, therefore, be more secure than the internal plug 112. For example, the internal end (e.g. internal key aperture 113) of the cylinder lock 11 may be configured to receive and/or be operated or actuated by a larger variety of actuation members than the external end (e.g. external key aperture 113) of the cylinder lock 11.

For example, the internal end of the cylinder lock 11 (e.g. internal plug 112) may include fewer pins, plates, discs, or wafers, or the like, compared to the external end of the cylinder lock 11 (e.g. external plug 112*e*). The internal end of the cylinder lock 11 (e.g. internal plug 112) may, for example, include between one and three pins, which may be set to a particular pin configuration. This pin configuration may be considered a baseline pin configuration. The external end of the cylinder lock 11 (e.g. external plug 112*e*) may include more pins than the internal end, and may for example include more than three pins, such as between four and eight pins. The external end of the cylinder lock 11 may include the baseline pin configuration, and may also include an additional pin configuration, which may be considered a security pin configuration. An actuation member keyed to the baseline pin configuration only may, therefore, be able to actuate the internal side of the cylinder lock 11, but may be unable to actuate the external side of the cylinder lock 11. Likewise, an actuation member which is keyed for both the baseline pin configuration and the security pin configuration may be able to actuate both ends of the cylinder lock 11.

The baseline pin configuration and security pin configuration may, more generally, be referred to as a baseline lock configuration and security lock configuration. The baseline lock configuration and security lock configuration can therefore be applied to other types of lock that use components other than pins, with the same functionality. Accordingly, an actuation member keyed for the baseline lock configuration only may be able to actuate the internal end of the cylinder lock 11 but not the external end of the cylinder lock 11, while an actuation member keyed for both the baseline lock configuration and the security lock configuration may be able to actuate both ends of the cylinder lock 11.

Accordingly, the thumbturn 116 (including the shaft) may be keyed for the baseline lock configuration, and may therefore be able to actuate the internal end of the cylinder lock 11 only. In this way, a universal thumbturn 116 may be provided for retrofitting to a variety of cylinder locks 11, without compromising the external security of the cylinder locks 11. A plurality of cylinder locks 11 may, therefore, all have the same baseline lock configuration, but may have unique security lock configurations.

The thumbturn 116 may include a retaining member configured to retain the thumbturn 116 in the key aperture 113, to inhibit accidental removal of the thumbturn 116. The thumbturn 116 may be removable by disengaging the retaining member. For example, the thumbturn 116 may include a spring-loaded portion configured to engage a corresponding recess in a part of the lock apparatus 1 (e.g. cylinder lock 11). An actuator may be provided to enable retraction of the spring-loaded portion.

In some versions, therefore, the smart key 12 may be used as the thumbturn 116.

In some versions the thumbturn 116 may be motorised such that the cylinder lock 11 may be operated electronically. The thumbturn 116 may, therefore, include a motor 28, and in some versions the motor 28 may be included in the smart actuation member circuit 2. The power source 22 may provide electrical power to enable the operation of the motor 28. The motor 28 may be configured to drive rotation of the thumbturn 116 and/or thumbturn shaft, which may therefore operate the cylinder lock 11 (e.g. by performing a locking or unlocking action). The motor 28 may be controlled by the processor or controller 21. In some versions, therefore, the motorised thumbturn 116 (and, therefore, the status of the cylinder lock 11) may be controlled remotely. For example, the receiver 25 may receive instructions to actuate the motor 28 from the hub or remote location (e.g. user device 50). The motor 28 may be actuated in response to the received instructions. The hub or remote location may be configured to transmit instructions to actuate the motor 28 periodically and/or at set times. For example, the hub or remote location may be configured to transmit instructions to actuate the motor 28 so as to perform a locking and/or unlocking action at a predetermined time each day (e.g. to ensure the cylinder lock 11 is in the locked state at night). Of course, in some versions, the user may use the user device 50 to send a lock or unlock instruction at any time.

The lock apparatus 1 may include a vibration sensor 27, and in some versions the thumbturn 116 may include the vibration sensor 27, and in some versions the vibration sensor 27 may be included in the smart actuation member circuit 2. The vibration sensor 27 may be fitted to a part of the leaf 30 to which the lock apparatus 1 is fitted. The vibration sensor 27 may be configured to detect vibrations, and may therefore be configured to detect attempted forced entry of the moveable panel to which the lock system 100 is fitted. The power source 22 may provide electrical power to enable the operation of the vibration sensor 27. The vibration sensor 27 may be operably coupled to the processor or controller 21, and may be configured to output vibration data to the processor or controller 21. In some versions the processor or controller 21 may be configured to analyse the vibration data and/or may be configured to send the vibration data to the remote location or hub (e.g. using the transmitter 24). The remote location or hub may be configured to analyse the vibration data. In versions where the vibration sensor 27 is provided separately from the smart actuation member circuit 2, a corresponding processor or controller, power source, and/or transmitter may be provided therewith.

The vibration data may be analysed to determine if forced entry has been attempted. The analysis may include comparing the vibration data to a threshold level. An attempted forced entry may be determined to have occurred if a measured vibration exceeds the threshold level. An alert may be issued if forced entry is determined to have been attempted. The alert may be issued by the smart actuation member circuit 2 and/or by the user device 50. The alert may be an audio, visual and/or haptic alert. The issuing of the alert may include the sending of instructions from the hub or remote location to the smart actuation member circuit 2 to issue the alert or vice versa. The user may, therefore, be alerted to an attempted forced entry.

The vibration sensor 27 may be configured to detect the insertion of a key into the cylinder lock 11 (e.g. into the key aperture 113) and/or the rotation of the key in the cylinder lock 11. The vibration sensor 27 may, therefore, be configured to detect locking or unlocking of the cylinder lock 11. The key may be the smart key 12 described herein or may be a standard key 44 configured to operate the cylinder lock 11. A setup process may be performed to determine a vibration fingerprint corresponding to an action of the key relative to the cylinder lock 11. A vibration fingerprint may be a distinctive vibration measurement (e.g. vibration pattern) corresponding to the action of the key. The action of the key may include insertion into the key aperture 113, removal from the key aperture 113, rotation in a first direction with respect to the cylinder lock 11 (such as a locking direction), and/or rotation in a second direction with respect to the cylinder lock 11 (such as an unlocking direction). The setup process may include the performance of each action a predetermined number of times (e.g. five) to establish the vibration fingerprint for that action. The user may use the user device 50 to specify which action is being performed in each case (e.g. by selecting or inputting the action on a configuration screen presented to the user).

If use of a standard key 44 is detected (e.g. where the vibration sensor 27 detects a vibration fingerprint corresponding to a key action, but where the smart key circuit 2 is not present), the processor or controller may be configured to output a signal (e.g. to the user device 50, remote device 52 and/or hub) indicating that the status of the cylinder lock 11 is unknown (e.g. it is not known whether the cylinder lock 11 is locked or unlocked). The status of the cylinder lock 11 may remain unknown until an actuation member including the smart actuation member circuit 2 is used to lock or unlock the cylinder lock 11 (at which point, as described herein, the status of the cylinder lock 11 can be determined).

Whilst the processor or controller 21 may, in some versions, determine the status of the cylinder lock 11 from the determined action of the key 12 and/or thumbturn 116 (as determined from the information provided by the or each sensor 23), in some versions the determined action of the key 12 and/or the determined action of the thumbturn 116 and/or the information from the or each sensor 23 may be transmitted (using the transmitter 24, for example) to the hub or remote location. The hub or remote location (or a computing device, such as a server communicatively coupled thereto) may use the received action of the key 12 and/or the received action of the thumbturn 116 and/or the received information to determine the status of the cylinder lock 11.

It will be appreciated the technology described herein is suitable for many different types of cylinder lock 11, including for example vertical keyed cylinders and horizontal keyed cylinders.

In some versions, the cylinder lock 11 may include a sacrificial part to enable re-keying of the cylinder lock 11. The sacrificial part may be located adjacent the pins, plates, discs, wafers, or the like, and may in some versions be integral with the pins, plates, discs, wafers, or the like. The sacrificial part may be located in the channel or passage for one of the pins, plates, discs, wafers, or the like. For example, the sacrificial part may be a wafer, which may be located in a pin passage. The sacrificial part may be a ball bearing, which may be located in a pin passage. The sacrificial part may be configured such that the keying (i.e. the specific configuration of pins etc. within the cylinder lock 11) of the cylinder lock 11 is changed when the sacrificial part is sacrificed. Accordingly, the keying of the cylinder lock 11 may be changed from a first keying to a second keying by sacrificing the sacrificial part.

Initially, therefore, the cylinder lock 11 may be configured for use with a "standard" (i.e. not including the smart actuation member circuit 2) key 44 which does not include the smart actuation member circuit 2. This key 44 may be considered a "non-smart" key 44. However, the cylinder lock 11 may be further configured for use with the key 12 (i.e. a "smart" key). The cylinder lock 11 configuration which enables operation of the cylinder lock 11 using either the standard key 44 or the key 12 may, therefore, be considered the first keying of the cylinder lock 11.

The key 12 may be configured to sacrifice the sacrificial part of the cylinder lock 11. The key 12 may include a receiving portion configured to receive, at least partially, the sacrificial part. The receiving portion may be located on the shaft 12b of the key 12. The receiving portion may be configured to receive, at least partially, the ball bearing or wafer from the cylinder lock 11. In some versions, therefore, the sacrificial part may be removed from the cylinder lock 11 by the key 12.

For example, the key 12 may be inserted into the cylinder lock 11 (e.g. into the key aperture 113) and may be rotated with respect to the body 111 as described previously. Rotation of the key 12 may cause the sacrificial part to be sacrificed, thereby re-keying the cylinder lock 11. For example, rotation of the key 12 may cause the sacrificial part to be received by the receiving portion of the key 12. The sacrificial part may then be removed from the lock when the key 12 is withdrawn from the cylinder lock 11 (e.g. from the key aperture 113).

In some versions, the sacrificial part may be sacrificed by the key 12 but may remain within the cylinder lock 11. The plug 112 may, therefore, include a plug receiving portion configured to receive, at least partially, the sacrificial part. The plug receiving portion may be configured to receive, at least partially, the ball bearing or wafer from the cylinder lock 11. The plug receiving portion may be located on an outer surface of the plug 112 (e.g. on a distal surface relative to the key aperture 113).

For example, the key 12 may be inserted into the cylinder lock 11 (e.g. into the key aperture 113) and may be rotated with respect to the body 111 as described previously. Rotation of the key 12 may cause the sacrificial part to be sacrificed, thereby re-keying the cylinder lock 11. For example, rotation of the key 12 may cause the sacrificial part to be received by the plug receiving portion of the plug 112. The sacrificial part may then be retained in the plug receiving portion when the key 12 is withdrawn from the cylinder lock 11 (e.g. from the key aperture 113). With the sacrificial part retained in the plug receiving portion, the cylinder lock 11 may be re-keyed.

After the sacrificial part has been sacrificed, the standard key 44 may no longer operate the cylinder lock 11. However, the key 12 may continue to operate the cylinder lock 11. The cylinder lock 11 configuration which enables operation of the cylinder lock 11 using only the key 12 may, therefore, be considered the second keying of the cylinder lock 11.

Inclusion of the sacrificial part in the cylinder lock 11 may, therefore, allow the cylinder lock 11 to be re-keyed such that only the key 12 (and copies thereof) can be used to operate the cylinder lock. Accordingly, it may not be possible to operate the cylinder lock 11 with the standard key 44 after the key 12 has been used to operate the cylinder lock 11. This may ensure that the lock status determined using the smart actuation member circuit 2 is accurate. For example, if the cylinder lock 11 does not include the sacrificial part, it may be possible to operate the cylinder lock 11 using the standard key 44 even after the key 12 has been used to operate the cylinder lock 11. For example, this could mean that the cylinder lock 11 is unlocked using the standard key 44 after the cylinder lock 11 has been locked using the key 12, meaning that the lock status determined using the smart actuation member circuit 2 may be inaccurate. By including the sacrificial part in the cylinder lock 11, this problem can be avoided, ensuring an accurate lock status.

In some versions, there is provided a cylinder lock including a magnet bore configured to receive a magnet, and a smart key circuit for use with a key which is keyed for the cylinder lock, the smart key circuit including: one or more magnetic field sensors configured to sense an action of the smart key circuit with respect to the cylinder lock; and a processor or controller configured to receive information indicative of the sensed action from the or each sensor for use in determining a status of the cylinder lock. A thumbturn may be provided instead of a key.

In some versions, there is provided a smart key circuit for use with a key which is keyed for a cylinder lock, the smart key circuit including: two magnetic field sensors configured to sense an action of the smart key circuit with respect to the cylinder lock; and a processor or controller configured to receive information indicative of the sensed action from the or each sensor for use in determining a status of the cylinder lock, wherein a first magnetic field sensor is configured to be located on a first side of a shaft of the key and a second magnetic field sensor is configured to be located on a second side of the shaft. A thumbturn may be provided instead of a key.

In some versions, there is provided a lock apparatus including a cylinder lock and a key which is keyed for the cylinder lock, wherein: the cylinder lock includes a magnet received in a magnet bore, and the key includes a smart key circuit, the smart key circuit including: one or more magnetic field sensors configured to sense an action of the smart key circuit with respect to the cylinder lock; and a processor or controller configured to receive information indicative of the sensed action from the or each sensor for use in determining a status of the cylinder lock, wherein the or each magnetic field sensor and the magnet are configured such that rotation of the key moves the or each sensor through the magnetic field of the magnet and the magnet is configured such that this movement will change the sensed polarity of the magnetic field as the or each sensor passes the magnet. A thumbturn may be provided instead of a key.

In some versions, there is provided a cylinder lock including first and second magnets, wherein the first magnet is disposed a first distance from a lock cylinder of the cylinder lock and the second magnet is disposed a second distance from the lock cylinder, and a smart key circuit for use with a key which is keyed for the cylinder lock, the smart key circuit including: one or more magnetic field sensors configured to sense an action of the smart key circuit with respect to the cylinder lock; and a processor or controller configured to receive information indicative of the sensed action from the or each sensor for use in determining a status of the cylinder lock. A thumbturn may be provided instead of a key.

In some versions, there is provided a lock apparatus including a cylinder lock and a key which is keyed for the cylinder lock, wherein: the cylinder lock includes a magnet received in a magnet bore, and the key includes a smart key circuit, the smart key circuit including: first and second magnetic field sensors configured to sense an action of the smart key circuit with respect to the cylinder lock; and a processor or controller configured to receive information indicative of the sensed action from the or each sensor for use in determining a status of the cylinder lock, wherein each magnetic field sensor and the magnet are configured such that rotation of the key moves each sensor through the magnetic field of the magnet and the magnet is configured such that this movement will change the sensed polarity of the magnetic field as each sensor passes the magnet, and wherein each magnetic field sensor and the magnet are configured such that the first magnetic field sensor senses a magnetic field of a particular polarity and the second magnetic field sensor senses a magnetic field of the opposite polarity. A thumbturn may be provided instead of a key.

As will be appreciated, therefore, users may choose to retrofit the thumbturn 116 (including the smart actuation member circuit 2) to the cylinder lock 11, for example by replacing an existing thumbturn with the thumbturn 116 or by installing the thumbturn 116 including the key-like shaft into the key aperture 113 of the cylinder lock 11 (in normal use, on an internal side thereof). This may provide a high level of convenience for the user and may enable the status of the cylinder lock 11 to be determined even when standard keys 44 are used to actuate the external end of the cylinder lock 11. Other users, who may prefer a higher level of security, may choose not to install the thumbturn 116, and may instead use the smart key or keys 12 (including the smart actuation member circuit 2) to actuate both ends of the cylinder lock 11. If a user chooses to use smart keys 12, techniques have been described herein to address the problem of the potential use of standard keys 44 with the same cylinder lock 11 (e.g. by including the sacrificial part or by using the vibration sensor to detect the use of a standard key 44).

It will also be appreciated that cylinder locks 11 configured for use with the thumbturn 116 may include a single magnet 115 adjacent the thumbturn 116 (i.e. at the internal end of the cylinder lock 11 only), but may include other magnets—although the additional magnets may not be required to determine the status of the cylinder lock 11. Cylinder locks 11 configured for use with smart keys 12 may include the magnet 115 at both ends of the cylinder lock 11, and those magnets 115 may be arranged as described herein (e.g. such that the sensed polarity changes as the actuation member rotates with respect to the magnet).

When used in this specification and claims, the terms "comprises" and "comprising" and variations thereof mean that the specified features, steps or integers are included. The terms are not to be interpreted to exclude the presence of other features, steps or components.

The invention may also broadly consist in the parts, elements, steps, examples and/or features referred to or indicated in the specification individually or collectively in any and all combinations of two or more said parts, elements, steps, examples and/or features. In particular, one or more features in any of the embodiments described herein may be combined with one or more features from any other embodiment(s) described herein.

Protection may be sought for any features disclosed in any one or more published documents referenced herein in combination with the present disclosure.

Although certain example embodiments of the invention have been described, the scope of the appended claims is not intended to be limited solely to these embodiments. The claims are to be construed literally, purposively, and/or to encompass equivalents.

Representative features are set out in the following clauses, which stand alone or may be combined, in any combination, with one or more features disclosed in the text and/or drawings of the specification.

1. A smart key circuit for use with a key which is keyed for a cylinder lock, the smart key circuit including:
   one or more sensors configured to sense an action of the smart key circuit with respect to the cylinder lock; and
   a processor or controller configured to receive information indicative of the sensed action from the or each sensor for use in determining a status of the cylinder lock.

2. A smart key circuit according to clause 1, wherein the one or more sensors includes at least one magnetic field sensor.

3. A smart key circuit according to clause 1 or 2, wherein the one or more sensors includes at least one magnetic field sensor.

4. A smart key circuit according to clause 3, wherein the one or more sensors includes two magnetic field sensors.

5. A smart key circuit according to clause 4, wherein the two magnetic field sensors are spaced apart with respect to each other.

6. A smart key circuit according to clause 3 or 4, wherein the or each magnetic field sensor is configured to sense one or more of: the presence of a magnetic field, the polarity of a magnetic field, and the strength of a magnetic field.

7. A smart key circuit according to clause 6, wherein the or each magnetic field sensor includes at least one Hall Effect sensor.

8. A smart key circuit according to clause 7 when dependent on clause 5, wherein the magnetic field sensors are each respective Hall Effect sensors.

9. A smart key circuit according to any preceding clause, wherein the processor or controller is configured to determine a movement of the smart key circuit with respect to the cylinder lock based on the received information.

10. A smart key circuit according to clause 9, wherein the smart key circuit is fitted to the key.

11. A smart key circuit according to clause 10, wherein the processor or controller is configured to determining one or more of:
    insertion of the key into the cylinder lock;
    removal of the key from the cylinder lock;
    rotation of the key with respect to the cylinder lock in a first direction;
    rotation of the key with respect to the cylinder lock in a second direction;
    a degree of rotation of the key with respect to the cylinder lock in the first direction; and
    a degree of rotation of the key with respect to the cylinder lock in the second direction.

12. A smart key circuit according to clause 11, wherein the processor or controller is configured to determine one or more of the rotation of the key with respect to the cylinder lock in a first direction; the rotation of the key with respect to the cylinder lock in a second direction; the degree of rotation of the key with respect to the cylinder lock in the first direction; and the degree of rotation of the key with respect to the cylinder lock in the second direction, by at least in part using information about one or more of a polarity of a sensed magnetic field and a field strength of a sensed magnetic field, wherein this information is provided by the or each sensor.

13. A smart key circuit according to clause 12, wherein the processor or controller is configured to determine a status of the cylinder lock based on the determined action of the smart key circuit.

14. A smart key circuit according to any preceding clause, wherein the or each sensor includes one or more of an acceleration and proximity sensor.

15. A smart key circuit according to any preceding clause, wherein the processor or controller is configured to transmit the received information to a hub or remote location.

16. A key including a smart key circuit of any preceding clause.

17. A cylinder lock configured for use with the smart key circuit of any of clauses 1 to 15 or the key of clause 16.

18. A cylinder lock according to clause 17, further including a magnet bore configured to receive a magnet.

19. A cylinder lock according to clause 18, further including the magnet.

20. A lock apparatus including the key of clause 16 and the cylinder lock of clause 18 or 19.

21. A lock apparatus according to clause 20, wherein the or each sensor and the magnet are configured such that rotation of the key moves the or each sensor through the magnetic field of the magnet.

22. A lock apparatus according to clause 21, wherein the or each sensor is configured to move through the magnetic field in a first direction with rotation of the key and the magnet is configured such that this movement will change the sensed polarity of the magnetic field as the or each sensor passes the magnet.

23. A method of fitting a cylinder lock to a lock system, the method including:
    providing a cylinder lock according to clause 18 or 19; and
    fitting the cylinder lock to the lock system.

24. A method according to clause 23, further including the step of removing an existing cylinder lock from the lock system before fitting the cylinder lock to the lock system.

A1. A lock apparatus including a cylinder lock and an actuation member configured to operate the cylinder lock via rotation of the actuation member with respect to a part of the cylinder lock, wherein:
    the cylinder lock includes a magnet, and
    the actuation member includes a smart actuation member circuit, the smart actuation member circuit including:
       one or more sensors configured to sense an action of the smart actuation member circuit with respect to the cylinder lock, the one or more sensors including one or more magnetic field sensors; and
       a processor or controller configured to receive information indicative of the sensed action from the or each sensor for use in determining a status of the cylinder lock,
       wherein the or each magnetic field sensor and the magnet are configured such that rotation of the actuation member to operate the cylinder lock moves the or each magnetic field sensor through the magnetic field of the magnet and the magnet is configured such that this movement changes the sensed polarity of the magnetic field as the or each magnetic field sensor passes the magnet.

A2. A lock apparatus according to clause A1, wherein the magnet is received in a magnet bore in the cylinder lock.

A3. A lock apparatus according to any preceding clause, wherein the actuation member is a key or thumbturn.

A4. A lock apparatus according to any preceding clause, wherein the one or more sensors include an acceleration sensor.

A5. A lock apparatus according to any preceding clause, wherein the or each magnetic field sensor is configured to sense the strength of the magnetic field.

A6. A lock apparatus according to any preceding clause, wherein the or each magnetic field sensor includes at least one Hall Effect sensor.

A7. A lock apparatus according to any preceding clause, wherein the one or more magnetic field sensors include two magnetic field sensors.

A8. A lock apparatus according to clause A7, wherein the two magnetic field sensors are spaced apart with respect to each other.

A9. A lock apparatus according to clause A7 or A8, further including a third magnetic field sensor, wherein the third magnetic field sensor is a primary magnetic field sensor and the other magnetic field sensors are secondary magnetic field sensors, and the secondary magnetic field sensors are configured to be activated in response to the primary magnetic field sensor detecting a magnetic field.

A10. A lock apparatus according to any of clauses A7-A9, wherein the magnetic field sensors are each a respective Hall Effect sensor.

A11. A lock apparatus according to any preceding clause, wherein the sensed action is a movement of the smart actuation member circuit with respect to the part of the cylinder lock based on the received information.

A12. A lock apparatus according to clause A11, wherein the processor or controller is configured to determine the sensed action based on the received information, the sensed action being one or more of:
insertion of the actuation member into the cylinder lock;
removal of the actuation member from the cylinder lock;
rotation of the actuation member with respect to the cylinder lock in a first direction;
rotation of the actuation member with respect to the cylinder lock in a second direction;
a degree of rotation of the actuation member with respect to the cylinder lock in the first direction; and
a degree of rotation of the actuation member with respect to the cylinder lock in the second direction.

A13. A lock apparatus according to clause A12, wherein the processor or controller is configured to determine one or more of the rotation of the actuation member with respect to the cylinder lock in a first direction; the rotation of the actuation member with respect to the cylinder lock in a second direction; the degree of rotation of the actuation member with respect to the cylinder lock in the first direction; and the degree of rotation of the actuation member with respect to the cylinder lock in the second direction, by at least in part using information about the sensed polarity of the magnetic field.

A14. A lock apparatus according to clause A13, wherein the processor or controller is configured to determine a status of the cylinder lock based on the determined action of the smart actuation member circuit.

A15. A lock apparatus according to any preceding clause, wherein the one or more sensors includes one or more of a location sensor and a proximity sensor.

A16. A lock apparatus according to any preceding clause, wherein the cylinder lock includes a sacrificial part configured to change the keying of the cylinder lock from a first keying to a second keying upon sacrifice of the sacrificial part.

A17. A lock apparatus according to clause A16, wherein the actuation member is the key, and the key includes a receiving portion configured to receive the sacrificial part.

A18. A lock apparatus according to any preceding clause, wherein the processor or controller is configured to transmit the received information to a hub or remote location.

A19. A lock apparatus according to clause A18, further including the hub wherein the hub includes a hub includes a computing device.

A20. A lock apparatus according to any preceding clause, wherein the or each magnet has a magnetic axis which is substantially perpendicular to a rotational axis of the actuation member.

A21. A lock apparatus according to clause 20, wherein the or each magnetic axis is offset from the rotational axis of the actuation member.

A22. A lock apparatus according to any preceding clause, wherein the rotation of the actuation member to operate the cylinder lock includes rotation of a plug of the cylinder lock with respect to a body of the cylinder lock, the plug being configured for rotation with the actuation member.

A23. A lock apparatus according to clause A22, wherein the actuation member is removably received by the plug.

A24. A smart actuation member circuit for use in a lock cylinder apparatus according to any preceding clause.

A25. A smart key circuit for use with a key which is keyed for a cylinder lock, the smart key circuit including:
two magnetic field sensors configured to sense an action of the smart key circuit with respect to the cylinder lock; and
a processor or controller configured to receive information indicative of the sensed action from the or each sensor for use in determining a status of the cylinder lock,
wherein a first magnetic field sensor is configured to be located on a first side of a shaft of the key and a second magnetic field sensor is configured to be located on a second side of the shaft.

A26. A cylinder lock including:
a body;
a plug configured for rotation with respect to the body, about an axis of rotation, to operate the cylinder lock; and
a magnet, wherein a magnetic axis of the magnet is substantially perpendicular to the axis of rotation.

A27. A method of fitting a cylinder lock to a lock system, the method including:
providing a cylinder lock according to clause A26; and
fitting the cylinder lock to the lock system.

A28. A method according to clause A27, further including the step of removing an existing cylinder lock from the lock system before fitting the cylinder lock to the lock system.

The invention claimed is:

1. A lock apparatus including a cylinder lock and an actuation member configured to operate the cylinder lock via rotation of the actuation member with respect to a part of the cylinder lock, wherein:

the lock apparatus includes a magnet, and the actuation member includes a smart actuation member circuit, the smart actuation member circuit including:

one or more sensors configured to sense an action of the smart actuation member circuit with respect to the cylinder lock, the one or more sensors including one or more magnetic field sensors; and a processor or controller configured to receive information indicative of the sensed action from the or each sensor for use in determining a status of the cylinder lock, wherein the or each magnetic field sensor and the magnet are configured such that rotation of the actuation member to operate the cylinder lock moves the or each magnetic field sensor through a magnetic field of the magnet and the magnet is configured such that this movement changes a sensed polarity of the magnetic field as the or each magnetic field sensor passes the magnet.

2. The lock apparatus according to claim 1, wherein the magnet is received in a magnet bore in the cylinder lock or the magnet is housed in a magnet ring mated to the cylinder lock or a part of the cylinder lock.

3. The lock apparatus according to claim 1, wherein the actuation member is one of a key and a thumbturn.

4. The lock apparatus according to claim 1, wherein the one or more sensors include an acceleration sensor.

5. The lock apparatus according to claim 1, wherein the or each magnetic field sensor is configured to sense strength of the magnetic field.

6. The lock apparatus according to claim 1, wherein the or each magnetic field sensor includes at least one Hall Effect sensor.

7. The lock apparatus according to claim 1, wherein the one or more magnetic field sensors include two magnetic field sensors.

8. The lock apparatus according to claim 7, wherein the two magnetic field sensors are spaced apart with respect to each other.

9. The lock apparatus according to claim 7, further including a third magnetic field sensor, wherein the third magnetic field sensor is a primary magnetic field sensor and other magnetic field sensors are secondary magnetic field sensors, and the secondary magnetic field sensors are configured to be activated in response to the primary magnetic field sensor detecting a magnetic field.

10. The lock apparatus according to claim 7, wherein the two magnetic field sensors are each a respective Hall Effect sensor.

11. The lock apparatus according to claim 1, wherein the sensed action is a movement of the smart actuation member circuit with respect to the part of the cylinder lock based on the received information.

12. The lock apparatus according to claim 11, wherein the processor or controller is configured to determine the sensed action based on the received information, the sensed action being one or more of:

insertion of the actuation member into the cylinder lock;

46 removal of the actuation member from the cylinder lock;

rotation of the actuation member with respect to the cylinder lock in a first direction;

rotation of the actuation member with respect to the cylinder lock in a second direction;

a degree of rotation of the actuation member with respect to the cylinder lock in the first direction; and a degree of rotation of the actuation member with respect to the cylinder lock in the second direction.

13. The lock apparatus according to claim 12, wherein the processor or controller is configured to determine one or more of the rotation of the actuation member with respect to the cylinder lock in a first direction; the rotation of the actuation member with respect to the cylinder lock in a second direction; the degree of rotation of the actuation member with respect to the cylinder lock in the first direction; and the degree of rotation of the actuation member with respect to the cylinder lock in the second direction, by at least in part using information about the sensed polarity of the magnetic field.

14. The lock apparatus according to claim 13, wherein the processor or controller is configured to determine a status of the cylinder lock based on the determined action of the smart actuation member circuit.

15. The lock apparatus according to claim 1, wherein the one or more sensors includes one or more of a location sensor and a proximity sensor.

16. The lock apparatus according to claim 1, wherein the cylinder lock includes a sacrificial part configured to change a keying of the cylinder lock from a first keying to a second keying upon sacrifice of the sacrificial part.

17. The lock apparatus according to claim 16, wherein the actuation member is a key, and the key includes a receiving portion configured to receive the sacrificial part.

18. The lock apparatus according to claim 1, wherein the magnet has a magnetic axis which is substantially perpendicular to a rotational axis of the actuation member.

19. The lock apparatus according to claim 18, wherein the magnetic axis is offset from the rotational axis of the actuation member.

20. The lock apparatus according to claim 1, wherein the rotation of the actuation member to operate the cylinder lock includes rotation of a plug of the cylinder lock with respect to a body of the cylinder lock, the plug being configured for rotation with the actuation member.

21. A lock apparatus according to claim 20, wherein the actuation member is removably received by the plug.

22. A smart key circuit for use with a key which is keyed for a cylinder lock, the smart key circuit including:

two magnetic field sensors configured to sense an action of the smart key circuit with respect to the cylinder lock; and a processor or controller configured to receive information indicative of the sensed action from the sensor, including a change in a sensed polarity of a magnetic field for use in determining a status of the cylinder lock, wherein a first magnetic field sensor is configured to be located on a first side of a shaft of the key and a second magnetic field sensor is configured to be located on a second side of the shaft.

23. A cylinder lock including:

a body;

a plug configured for rotation with respect to the body, about an axis of rotation, to operate the cylinder lock; and a magnet, wherein a magnetic axis of the magnet is
substantially perpendicular to the axis of rotation.

* * * * *